US008891254B2

(12) United States Patent
Kominami et al.

(10) Patent No.: US 8,891,254 B2
(45) Date of Patent: Nov. 18, 2014

(54) POWER CONVERTER AND BATTERY CHARGER USING THE SAME

(71) Applicant: Panasonic Corporation, Osaka (JP)

(72) Inventors: Satoshi Kominami, Osaka (JP); Hideki Nakata, Osaka (JP); Satoshi Moriguchi, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/124,025

(22) PCT Filed: May 31, 2013

(86) PCT No.: PCT/JP2013/003443
§ 371 (c)(1),
(2), (4) Date: Dec. 5, 2013

(87) PCT Pub. No.: WO2013/179674
PCT Pub. Date: Dec. 5, 2013

(65) Prior Publication Data
US 2014/0103860 A1 Apr. 17, 2014

(30) Foreign Application Priority Data
Jun. 1, 2012 (JP) ................................ 2012-126477

(51) Int. Cl.
H02M 3/335 (2006.01)
H02M 7/44 (2006.01)
H02J 7/00 (2006.01)
H02M 7/48 (2006.01)
H02J 7/02 (2006.01)

(52) U.S. Cl.
CPC ............. *H02J 7/022* (2013.01); *H02J 7/0013* (2013.01); *H02M 7/4807* (2013.01); *H02J 7/0054* (2013.01); *H02M 3/335* (2013.01)
USPC ............................................. 363/17; 363/98

(58) Field of Classification Search
CPC ............................................... H02M 3/33569
USPC .................... 363/16, 17, 97, 98, 131, 132
See application file for complete search history.

(56) References Cited

U.S. PATENT DOCUMENTS 7,436,684 B2 * 10/2008 Dermark ........................ 363/17
8,027,179 B2 * 9/2011 Hallak ............................ 363/98
8,208,274 B2 * 6/2012 Raju et al. ...................... 363/17

FOREIGN PATENT DOCUMENTS

CN 102158105 8/2011
JP 63-033337 3/1988

(Continued)

OTHER PUBLICATIONS

International Search Report issued Aug. 6, 2013 in corresponding International Application No. PCT/JP2013/003443.

(Continued)

Primary Examiner — Matthew Nguyen
(74) Attorney, Agent, or Firm — Wenderoth, Lind & Ponack, L.L.P.

(57) ABSTRACT

A power converter including: a transformer in which first and second voltages are induced; a full-bridge circuit including parallel-connected first and second arms each including series-connected FETs; and a control circuit, wherein, within a given time period for which a voltage V2 is the first voltage, the control circuit performs control so that FETs in at least one arm are on for an on time period, and, when $P_{on}$, $P_X$, $P_S$, $\alpha$, and $\beta$ respectively denote a duration of the on time period, a duration of the given time period, a duration of a time period from the end of the on time period to a time point of transition from the first to second voltage, a rise time of a body diode of each FET, and a fall time of the body diode, $P_{on} > (\beta/\alpha)P_S$, $0 \leq P_S < \alpha$, and $P_{on} + P_S \leq P_X$ are satisfied.

20 Claims, 21 Drawing Sheets

(56) References Cited

FOREIGN PATENT DOCUMENTS

| JP | 8-154311 | 6/1996 |
| JP | 2002-335674 | 11/2002 |
| JP | 2009-232502 | 10/2009 |
| JP | 2011-114958 | 6/2011 |
| JP | 4924499 | 4/2012 |
| WO | 2013/073173 | 5/2013 |

OTHER PUBLICATIONS

Witten Opinion of the International Searching Authority issued Aug. 6, 2013 in corresponding International Application No. PCT/JP2013/003443 (with English translation).

Office Action issued on Jun. 13, 2014 in corresponding Chinese Patent Application No. 201380001623.4 (with partial English translation).

* cited by examiner

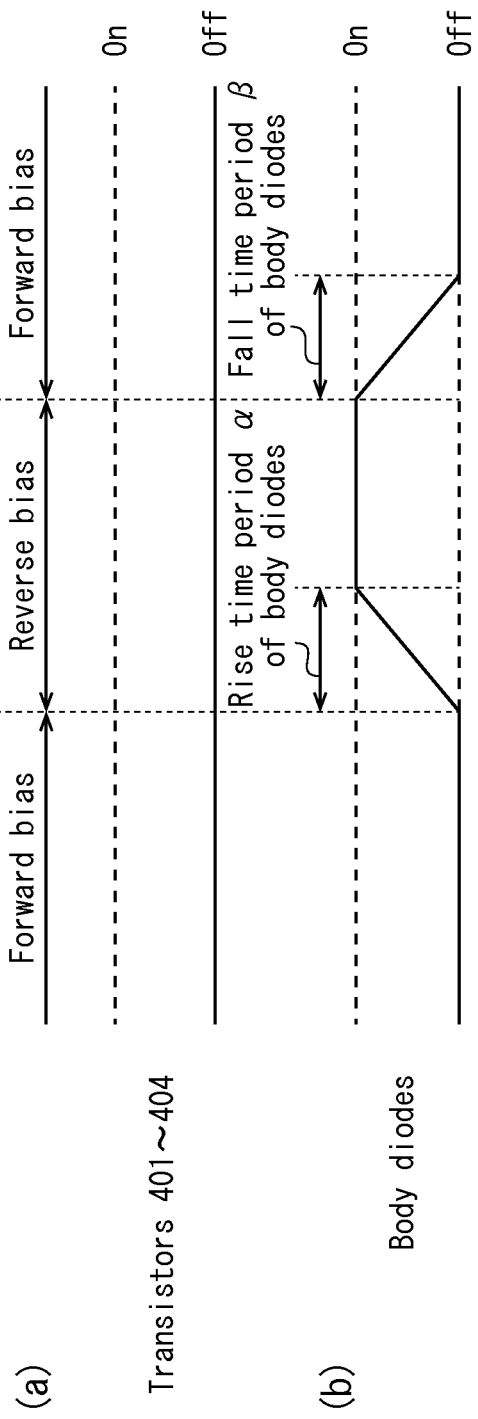

FIG. 5A Time period A
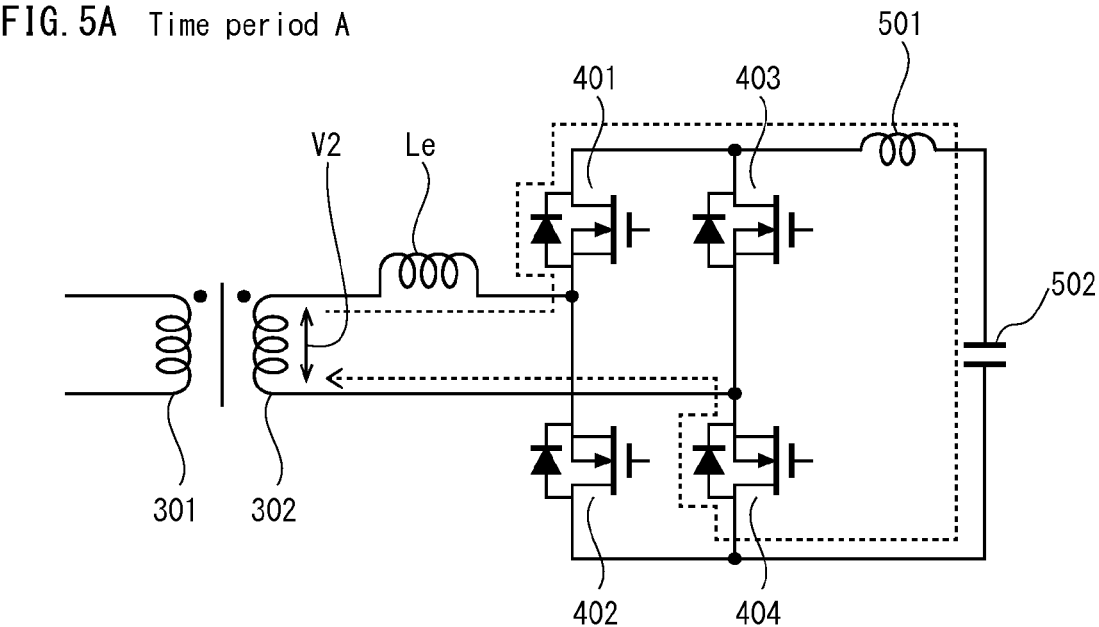
FIG. 5B Time period B
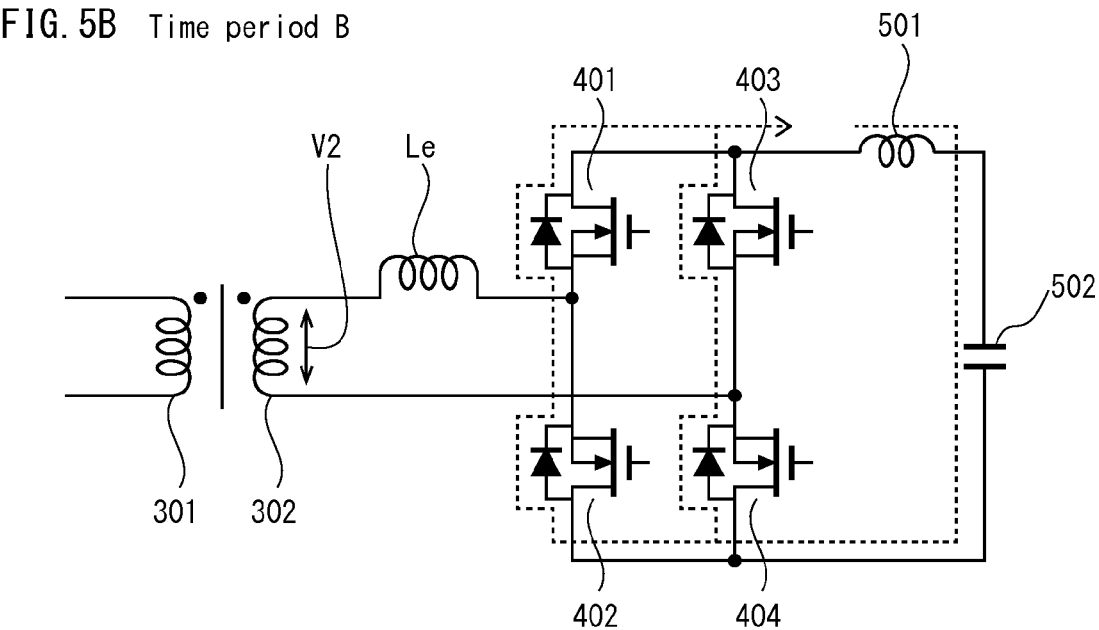

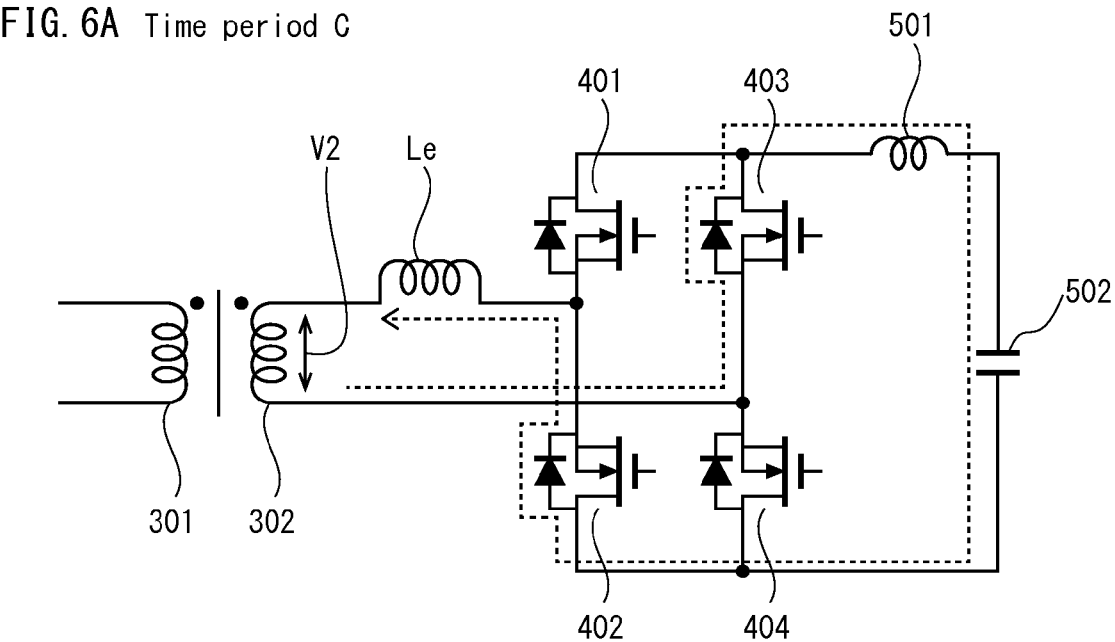
FIG. 6A Time period C
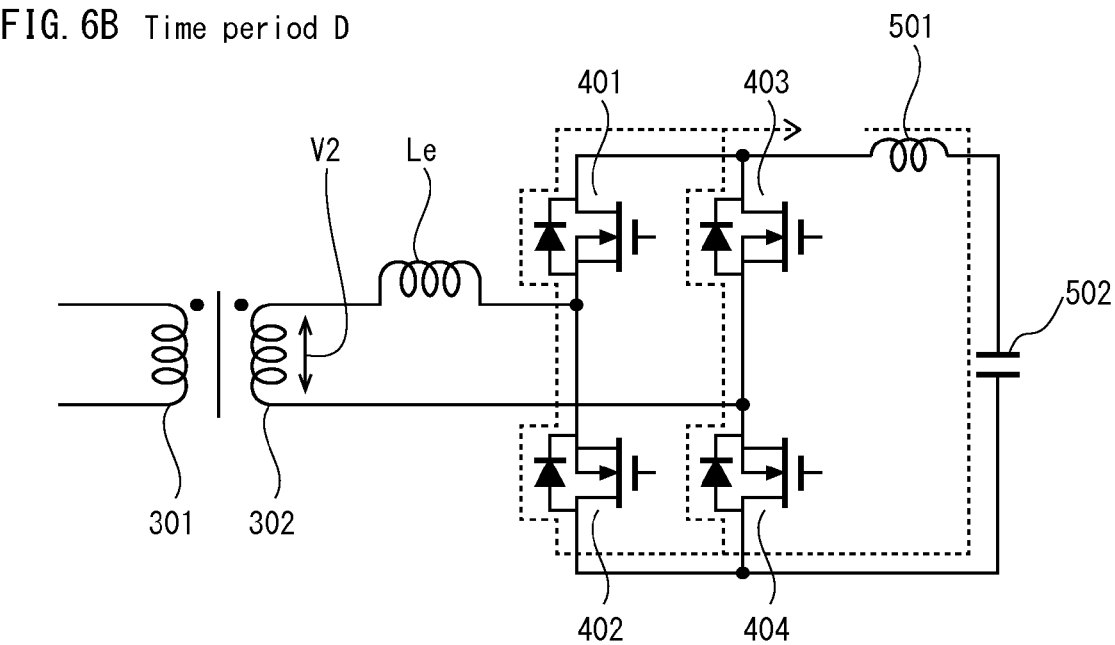
FIG. 6B Time period D

POWER CONVERTER AND BATTERY CHARGER USING THE SAME

TITLE OF INVENTION

1. Technical Field

The present invention relates to a power converter including a full-bridge circuit composed of field-effect transistors (hereinafter, referred to as FETs), and a battery charger using the power converter.

2. Background Art

There is a power converter that includes a transformer and a rectifier circuit, and has an output terminal connected to an inductor (e.g. Patent Literature 1). FIG. 20 is a circuit diagram showing the configuration of the power converter pertaining to Patent Literature 1. Patent Literature 1 discloses an example of using the power converter in a battery charger loaded in an electric vehicle equipped with a main battery and a sub-battery.

The battery charger disclosed in Patent Literature 1 includes: a power supply circuit 9002 connected to an external power supply 9001; a transformer 9003; a secondary side circuit 9004; a smoothing circuit 9006 between the secondary side circuit 9004 and a main battery 9005; a conduction angle adjustment circuit 9007; and a rectifier/smoothing circuit 9008 between the conduction angle adjustment circuit 9007 and a sub-battery 9009.

During charging of the main battery 9005, a relay 9010 is connected to a capacitor 9011. The secondary side circuit 9004 turns off both a transistor 9004a and a transistor 9004b so as to use body diodes thereof to operate as a rectifier circuit for converting an AC voltage induced in a secondary winding 9003a of the transformer 9003 into a DC voltage. During charging of the sub-battery 9009, the relay 9010 is connected to a choke coil 9012, which is the inductor. The secondary side circuit 9004 alternately turns on the transistor 9004a and the transistor 9004b so that a state where the transistor 9004a is on and the transistor 9004b is off and a state where the transistor 9004a is off and the transistor 9004b is on are alternately repeated, thereby converting a DC voltage into an AC voltage. As described above, the power converter including the transformer 9003 and the secondary side circuit 9004 can convert an input AC voltage into a DC voltage, and vice versa.

CITATION LIST

Patent Literature

Patent Literature 1
Japanese Patent Application Publication No. 8-154311

SUMMARY OF INVENTION

Technical Problem

In the conventional power converter as described above, there is a need to suppress noise generated from the power converter.

The present invention aims to provide a power converter and a battery charger using the power converter each can suppress generation of noise.

Solution to Problem

A power converter disclosed in the present description is a power converter having an output terminal connected to an inductor, comprising: a transformer in which a first voltage serving as a reference voltage and a second voltage different from the first voltage are alternately induced; a full-bridge circuit on a power supply route connecting the transformer to the inductor, the full-bridge circuit including a first arm and a second arm connected in parallel, the first arm and the second arm each including a plurality of field-effect transistors connected in series; and a control circuit configured to perform control to turn on and off each of the field-effect transistors included in the full-bridge circuit, wherein within a time period for which the first voltage is induced in the transformer, the control circuit performs control so that each of the field-effect transistors included in at least one of the first arm and the second arm is on, and, when $P_{on}$ denotes a duration of an on time period for which each of the field-effect transistors included in the at least one of the first arm and the second arm is on, $P_X$ denotes a duration of the time period for which the first voltage is induced in the transformer, $P_S$ denotes a duration of a time period from the end of the on time period to a time point when the first voltage induced in the transformer transitions to the second voltage, $\alpha$ denotes a duration of a rise time of a body diode of each of the field-effect transistors, and $\beta$ denotes a duration of a fall time of the body diode, $P_{on}$, $P_X$, $P_S$, $\alpha$, and $\beta$ satisfy the relations $P_{on} > (\beta/\alpha)P_S$, $0 \leq P_S < \alpha$, and $P_{on} + P_S \leq P_X$.

Advantageous Effects of Invention

According to the power converter disclosed in the present description, a surge voltage generated in a transformer can be lowered. As a result, noise generated from the power converter can be reduced.

BRIEF DESCRIPTION OF DRAWINGS

FIG. 4 shows, in (a) and (b), a timing diagram for explaining characteristics of the body diodes of the transistors 401 to 404.

FIGS. 5A and 5B show ideal flows of current through the power converter in the first time period.

FIGS. 6A and 6B show ideal flows of current through the power converter in the first time period.

DESCRIPTION OF EMBODIMENTS

In the power converter pertaining to Patent Literature 1, the secondary winding 9003a of the transformer 9003 has a center tap 9013. This increases the number of terminals of the transformer 9003 to three, leading to a problem of an increase in size of the power converter.

Figure 21:
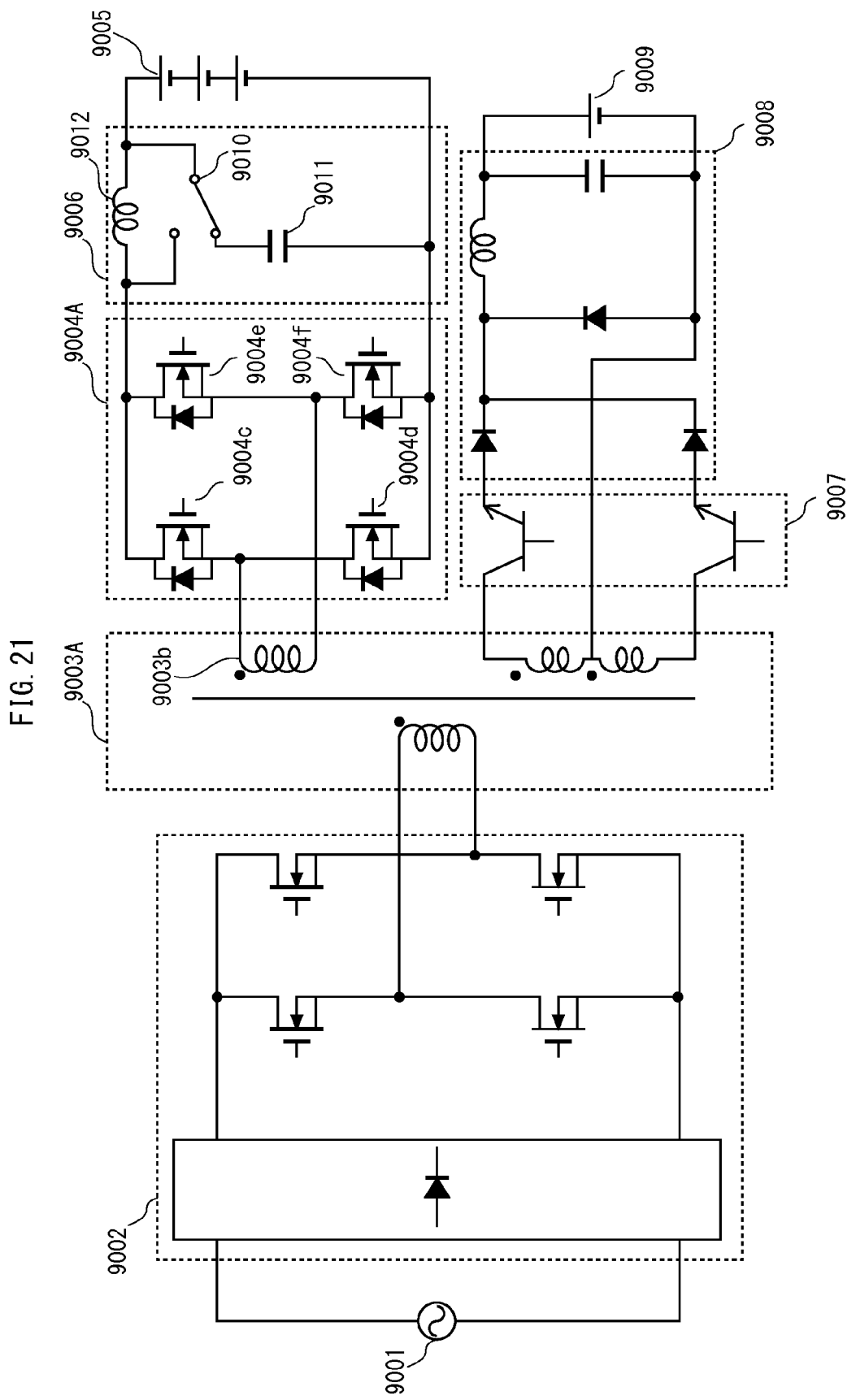
FIG. 21 is a circuit diagram showing an improvement example of the power converter pertaining to Patent Literature 1, having been devised by the present inventors.

To address the problem, the present inventors have devised a secondary side circuit having the following configuration. FIG. 21 is a circuit diagram showing an improvement example of the power converter pertaining to Patent Literature 1, having been devised by the present inventors. In the improvement example, a secondary side circuit 9004A is configured as a full-bridge circuit in which a first arm including transistors 9004c and 9004d, and a second arm including transistors 9004e and 9004f are connected in parallel. Since the number of input terminals of the full-bridge circuit is two, the secondary winding 9003b of the transformer 9003A only has to have two terminals. As described above, the configuration in which the transformer 9003A has no center tap can be achieved while maintaining a function to convert an AC voltage into a DC voltage, and vice versa. As a result, a size of the transformer 9003A can be reduced. Furthermore, since the transformer 9003A is a large component relative to the other components of the power converter, a total size of the power converter can be significantly reduced by reducing the size of the transformer 9003A.

During charging of the main battery 9005, in order to cause the secondary side circuit 9004A to operate as a rectifier circuit, each of the transistors 9004c to 9004f is turned off so as to allow current to flow through body diodes thereof. As a result of intense study, however, the present inventors have found that, only by performing the above-mentioned operation to cause the secondary side circuit 9004A to operate as the rectifier circuit, a high surge voltage might be generated in the transformer 9003A at the moment a voltage induced in the transformer 9003A transitions from a first voltage to a second voltage. The surge voltage can become a noise source, and thus can cause an increase in noise generated from the power converter. The present inventors have also found that the high surge voltage is generated due to current flowing through the body diodes of the transistors 9004c to 9004f at the moment or immediately before the voltage induced in the transformer 9003A transitions from the first voltage to the second voltage.

In the power converter disclosed in the present description, control is performed so that each transistor included in at least one of the first and second arms is on for an on time period within a time period for which the first voltage is induced in the transformer. Here, $P_X$ denotes a duration of a time period for which the first voltage is induced in the transformer, $P_S$ denotes a duration of a time period from the end of the on time period to the time point when the voltage induced in the transformer transitions from the first voltage to the second voltage, $\alpha$ denotes a duration of a rise time of a body diode of a transistor, and $\beta$ denotes a duration of a fall time of the body diode. A duration of the on time period $P_{on}$ and the durations $P_X$, $P_S$, $\alpha$, and $\beta$ are set to satisfy all of the following three relations: (A) $P_{on} > (\beta/\alpha)P_S$; (B) $0 \le P_S < \alpha$; and (C) $P_{on} + P_S \le P_X$.

Based on the above, a fall amount (an amount of decreasing current) of a body diode for the on time period is expressed as $P_{on}/\beta$. On the other hand, for the time period from the end of the on time period to the time point when the voltage induced in the transformer transitions from the first voltage to the second voltage, the transistor is off and the body diode of the transistor transitions to an on state. A rise amount (an amount of increasing current) of the body diode for the time period $P_S$ from the end of the on time period to the time point when the voltage induced in the transformer transitions from the first voltage to the second voltage is expressed as $P_S/\alpha$.

In the power converter disclosed in the present description, for a time period from the start of the on time period to the time point when the voltage induced in the transformer transitions from the first voltage to the second voltage, the fall amount of the body diode is set to be greater than the rise amount of the body diode. That is to say, by satisfying the relation $(P_{on}/\beta) > (P_S/\alpha)$, the body diode can basically be controlled so as not to completely rise in a time period for which current flows through the body diode under a typical control. By performing such control, the amount of current flowing through the body diode of the transistor can be reduced, compared to a case where the body diode has completely risen. As a result, the surge voltage generated in the transformer can be lowered. By solving the above-mentioned inequality $(P_{on}/\beta) > (P_S/\alpha)$ for $P_{on}$, the relation (A) can be obtained.

Even when the relation (A) is satisfied, however, if the duration of the time period $P_S$ is equal to or longer than the duration of the rise time $\alpha$ of the body diode, the body diode has completely risen at a time point when the voltage induced in the transformer transitions from the first voltage to the second voltage. To address this problem, the duration of the time period $P_S$ from the end of the on time period to the time point when the voltage induced in the transformer transitions from the first voltage to the second voltage is set to be shorter than the duration of the rise time $\alpha$ of the body diode. That is to say, by satisfying the above-mentioned relation (B), control can be performed so that the body diode has not completely risen at the time point when the voltage induced in the transformer transitions from the first voltage to the second voltage.

Furthermore, as shown in the above-mentioned relation (C), the sum of the duration of the time periods $P_{on}$ and $P_S$ is set to be equal to or shorter than the duration of the time period $P_X$, that is, the start of the on time period is set to be at or after a moment the voltage induced in the transformer transitions from the second voltage to the first voltage. If each of the transistors included in the arms is on within a time period for which the second voltage is induced in the transformer, short circuits might occur between these transistors. By satisfying the relation (C), however, occurrence of the short circuits can be prevented.

According to the power converter disclosed in the present description, the surge voltage generated in the transformer can be lowered. As a result, noise generated from the power converter can be reduced.

The following describes embodiments of the present invention with reference to the drawings.

Embodiment 1

Configuration of Battery Charger

Figure 1:
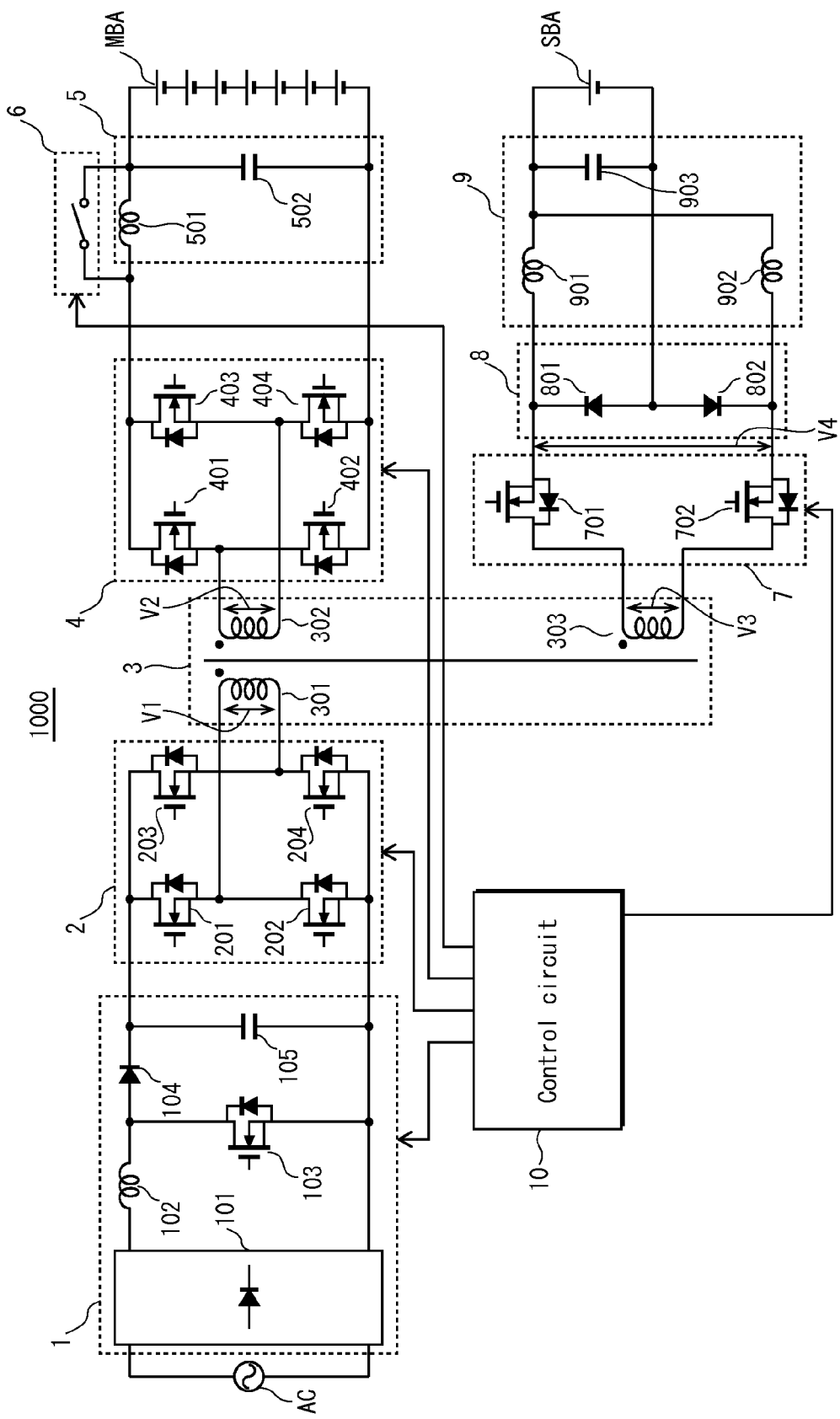
FIG. 1 is a circuit diagram showing the overall configuration of a battery charger 1000 pertaining to Embodiment 1.

FIG. 1 is a circuit diagram showing the overall configuration of a battery charger 1000 pertaining to Embodiment 1.

The battery charger 1000 includes a power factor correction circuit 1, a DC/AC inverter 2, a transformer 3, a secondary side circuit 4, a first smoothing circuit 5, a choke coil short circuit 6, a conduction angle adjustment circuit 7, a rectifier circuit 8, a second smoothing circuit 9, and a control circuit 10. A first secondary winding 302 of the transformer 3, the secondary side circuit 4, and the control circuit 10 constitute a power converter.

As with the battery charger disclosed in Patent Literature 1, the battery charger 1000 is loaded in an electric vehicle equipped with a main battery MBA and a sub-battery SBA. The main battery MBA outputs a higher voltage than the sub-battery SBA. The main battery MBA is used to power a drive motor, and the sub-battery SBA is used to power auxiliary machineries such as headlamps, a windscreen wiper, and various electronic devices.

The main battery MBA is typically charged by an external power supply AC for commercial use via a charging circuit, and the sub-battery SBA is typically charged by the main battery MBA via a power converting circuit. Although differing in input/output voltage specifications, the charging circuit and the power converting circuit are functionally and structurally similar to each other. By providing the secondary side circuit 4 with both of the functions as the charging circuit and the power converting circuit, the battery charger has smaller size and cost.

As in the above-mentioned typical configuration, in the battery charger 1000, the main battery MBA and the sub-battery SBA are charged by the external power supply AC while the battery charger 1000 is connected to the external power supply AC. While the battery charger 1000 is not connected to the external power supply AC, e.g. during driving an electric vehicle, the main battery MBA charges the sub-battery SBA. Hereinafter, a time period for which the main battery MBA and the sub-battery SBA are charged by the external power supply AC is referred to as a first time period, and a time period for which the main battery MBA charges the sub-battery SBA is referred to as a second time period.

<External Power Supply AC>

The external power supply AC is a commercial power supply of AC 100 V to 250 V installed in a home and the like.

<Main Battery MBA>

The main battery MBA is made up of a plurality of lithium-ion battery cells connected to one another, and generates a voltage of 250 V to 350 V, for example, depending on a state of charge. In the first time period, the main battery MBA is charged up to 350 V, for example.

<Sub-Battery SBA>

The sub-battery SBA is a lead battery with a rated voltage of 12 V, for example. The sub-battery SBA is charged by the external power supply AC in the first time period, and by the main battery MBA in the second time period.

<Power Factor Correction Circuit 1>

The power factor correction circuit 1 is connected to the external power supply AC, and includes a diode bridge 101, a choke coil 102, a transistor 103, a diode 104, and a capacitor 105. The power factor correction circuit 1 is a typical power factor correction circuit.

In the first time period, the power factor correction circuit 1 turns on and off the transistor 103 based on a signal from the control circuit 10, thereby converting an AC voltage supplied from the external power supply AC into a DC voltage of 380 V, for example. In the second time period, the power factor correction circuit 1 is in a stop state in which the operation to convert an AC voltage into a DC voltage is not performed.

Examples of the transistor 103 are a metal-insulator-semiconductor field-effect transistor (MISFET), a metal-oxide-semiconductor field-effect transistor (MOSFET), a metal-semiconductor field-effect transistor (MESFET), a junction field-effect transistor (JFET), and an insulated gate bipolar transistor (IGBT).

<DC/AC Inverter 2>

The DC/AC inverter 2 is configured as a full-bridge circuit composed of two arms connected in parallel. One of the arms includes transistors 201 and 202 connected in series, and the other one of the arms includes transistors 203 and 204 connected in series. Each of the transistors 201 to 204 incorporates a body diode therein. The power factor correction circuit 1 and the DC/AC inverter 2 constitute a power supply circuit connected to the external power supply and generating an AC voltage. The power supply circuit boosts an AC voltage supplied from the external power supply AC so as to charge the main battery MBA.

Examples of each of the transistors 201 to 204 are the MISFET, the MOSFET, the MESFET, the JFET, and the IGBT.

In the first time period, the DC/AC inverter 2 operates, based on a signal from the control circuit 10 so that (i) a time period for which the transistors 201 and 204 are on and the transistors 202 and 203 are off, (ii) a time period for which all the transistors 201 to 204 are off, (iii) a time period for which the transistors 201 and 204 are off and the transistors 202 and 203 are on, and (iv) the time period for which all the transistors 201 to 204 are off are repeated in that order at a frequency of 100 kHz. As a result, a DC voltage supplied from the power factor correction circuit 1 is converted into an AC voltage of 100 kHz, for example.

In the second time period, the DC/AC inverter 2 is in a stop state in which the operation to convert a DC voltage into an AC voltage is not performed, by turning off all the transistors 201 to 204 based on a signal from the control circuit 10.

<Transformer 3>

The transformer 3 has a primary winding 301, the first secondary winding 302, and a second secondary winding 303, and is connected to the DC/AC inverter 2 via the primary winding 301.

The primary winding 301 is connected to a junction of the transistors 201 and 202 at one end, and connected to a junction of the transistors 203 and 204 at the other end.

The first secondary winding 302 is connected to a junction of transistors 401 and 402 at one end, and connected to a junction of transistors 403 and 404 at the other end. In the first secondary winding 302, a first voltage serving as a reference voltage and a second voltage different from the first voltage are alternately induced. The second voltage includes a positive second voltage that is a finite value above the first voltage and a negative second voltage that is a finite value below the first voltage. In the present embodiment, assume that the first voltage (reference voltage) is 0 V, the positive second voltage is 380 V, and the negative second voltage is −380 V, by way of example.

Respective ends of the second secondary winding 303 are connected to drain terminals of transistors 701 and 702 constituting the conduction angle adjustment circuit 7. In the present embodiment, the primary winding 301, the first secondary winding 302, and the second secondary winding 303 are in a turns ratio of 5:5:1.

In the first time period, the transformer 3 transfers a voltage induced in the primary winding 301 to the first secondary winding 302 and the second secondary winding 303. In the second time period, the transformer 3 transfers the voltage induced in the first secondary winding 302 to the second secondary winding 303.

<Secondary Side Circuit 4>

The secondary side circuit 4 is on a power supply route connecting the transformer 3 and a choke coil 501 as an inductor described later. More specifically, the secondary side circuit 4 is on a power supply route connecting the first secondary winding 302 and the main battery MBA. The secondary side circuit 4 is configured as a full-bridge circuit composed of first and second arms connected in parallel. The first arm includes the transistors 401 and 402 connected in series, and the second arm includes the transistors 403 and 404 connected in series. Examples of each of the transistors 401 to 404 are the MISFET, the MOSFET, the MESFET, and the JFET, and each of the transistors 401 to 404 incorporates a body diode therein. The transistors 401 to 404 use the same specification.

The first arm, which includes the transistors 401 and 402, is connected to one end of the first secondary winding 302, and the second arm, which includes the transistors 403 and 404, is connected to the other end of the first secondary winding 302.

Since the secondary side circuit 4 is configured as the full-bridge circuit as described above, the configuration in which the first secondary winding 302 has no center tap can be achieved while maintaining functions of the battery charger pertaining to Patent Literature 1 to simultaneously charge the main battery and the sub-battery and to charge the sub-battery by using the main battery. The number of terminals of the first secondary winding 302 can thus be reduced. As a result, a size of the transformer 3 can be reduced.

Regarding the first secondary winding 302 that corresponds to a power supply route leading to the main battery with a small amount of current but with a high voltage, it is necessary to increase a distance between terminals of the first secondary winding 302 in terms of insulation. By reducing the number of terminals of the first secondary winding 302, the effect of reducing a size of the transformer 3 is increased. Furthermore, since the transformer 3 is a large component relative to the other components of the power converter, a total size of the power converter can be significantly reduced by reducing the size of the transformer 3.

Although the number of transistors included in the secondary side circuit 4 is increased by configuring the secondary side circuit 4 as a full-bridge circuit, the increase in number of transistors included in the secondary side circuit 4 has little effect on the size of the power converter as the transistors are small components relative to the other components of the power converter.

In the first time period, the secondary side circuit 4 rectifies an AC voltage induced in the first secondary winding 302 based on a signal from the control circuit 10. The secondary side circuit 4 then supplies the rectified voltage to the first smoothing circuit 5. The rectification is achieved by performing control to turn on and off each of the transistors 401 to 404. In the present embodiment, a special control is performed for the rectification. By performing the special control, a surge voltage generated in the first secondary winding 302 of the transformer 3 can be lowered. As a result, noise generated from the power converter can be reduced. Details of the special control are described in an Operation of Battery Charger section below.

In the second time period, the secondary side circuit 4 operates, based on a signal from the control circuit 10, so that (i) a time period for which the transistors 401 and 404 are on and the transistors 402 and 403 are off, (ii) a time period for which all the transistors 401 to 404 are off, (iii) a time period for which the transistors 401 and 404 are off and the transistors 402 and 403 are on, and (iv) the time period for which all the transistors 401 to 404 are off are repeated in that order at a frequency of 100 kHz. As a result, a DC voltage supplied from the main battery MBA is converted into an AC voltage of 100 kHz so as to charge the sub-battery SBA, and supplied to the first secondary winding 302.

<First Smoothing Circuit 5 and Choke Coil Short Circuit 6>

The smoothing circuit 5 is configured as a series circuit composed of a capacitor 502 and the choke coil 501 as the inductor. The choke coil short circuit 6 is achieved by a relay.

In the first time period, the choke coil short circuit 6 performs an opening operation based on a signal from the control circuit 10. As a result, the smoothing circuit 5 acts as a filter circuit composed of the choke coil 501 and the capacitor 502, and a predetermined DC voltage is generated in the capacitor 502.

In the second time period, the choke coil short circuit 6 performs a short-circuiting operation based on a signal from the control circuit 10. As a result, the choke coil 501 is short-circuited by the choke coil short circuit 6, and the smoothing circuit 5 functions as a mere capacitor.

<Conduction Angle Adjustment Circuit 7>

The conduction angle adjustment circuit 7 is on a power supply route connecting the second secondary winding 303 and the sub-battery SBA, and is composed of the transistors 701 and 702. An input side of the conduction angle adjustment circuit 7 is connected to the second secondary winding 303, and an output side of the conduction angle adjustment circuit 7 is connected to the rectifier circuit 8. The drain terminals of the transistors 701 and 702 are connected to the respective ends of the second secondary winding 303. Examples of each of the transistors 701 and 702 are the MISFET, the MOSFET, the MESFET, the JFET, and the IGBT.

In the first time period, the conduction angle adjustment circuit 7 adjusts a conduction angle of an AC voltage induced in the second secondary winding 303 so that the sub-battery SBA is charged. Specifically, the conduction angle adjustment circuit 7 turns on and off each of the transistors 701 and 702 based on a signal from the control circuit 10, thereby repeating a conductive state and a non-conductive state. In the conductive state, an AC voltage induced in the second secondary winding 303 is supplied to the rectifier circuit 8. In the non-conductive state, the AC voltage is not supplied to the rectifier circuit 8.

In the first time period in the present embodiment, the conduction angle adjustment circuit 7 is controlled to be in the conductive state when the special control is performed by the secondary side circuit 4. By performing such control, the surge voltage generated in the first secondary winding 302 is distributed to the second secondary winding 303. As a result, the surge voltage generated in the first secondary winding 302 is further lowered. Details of the above-mentioned control are also described in the Operation of Battery Charger section below.

In the second time period, the conduction angle adjustment circuit 7 adjusts the conduction angle of the AC voltage induced in the second secondary winding 303 so that an AC voltage to be supplied to the sub-battery SBA is obtained. Specifically, the conduction angle adjustment circuit 7 turns on the transistors 701 and 702 so as to supply the AC voltage induced in the second secondary winding 303 to the rectifier circuit 8.

<Rectifier Circuit 8>

The rectifier circuit 8 is a series circuit in which anode terminals of diodes 801 and 802 are connected to each other. A cathode terminal of the diode 801 is connected to a source terminal of the transistor 701, and a cathode terminal of the diode 802 is connected to a source terminal of the transistor 702.

Independent of the first time period or the second time period, the rectifier circuit 8 rectifies the AC voltage from the conduction angle adjustment circuit 7, and supplies the rectified voltage to the second smoothing circuit 9.

<Second Smoothing Circuit 9>

The second smoothing circuit 9 includes choke coils 901 and 902, and a capacitor 903. The choke coil 901 is connected to the choke coil 902 at one end, and connected to a junction of the transistor 701 and the diode 801 at the other end. The choke coil 902 is connected to the choke coil 901 at one end, and connected to a junction of the transistor 702 and the diode 802 at the other end. The capacitor 903 is connected to a junction of the choke coils 901 and 902 at one end, and connected to a junction of the diodes 801 and 802 at the other end.

Independent of the first time period or the second time period, the second smoothing circuit 9 acts as a filter circuit composed of the choke coil 901 and the capacitor 903 and as a filter circuit composed of the choke coil 902 and the capacitor 903 depending on the polarity of the AC voltage induced in the second secondary winding 303, thereby generating a predetermined DC voltage across the capacitor 903.

<Control Circuit 10>

The control circuit 10 control operations of the power factor correction circuit 1, the DC/AC inverter 2, the secondary side circuit 4, the choke coil short circuit 6, and the conduction angle adjustment circuit 7.

The control circuit 10 includes, for example, a digital circuit such as a micro controller unit (MCU) and a drive circuit for driving each of the transistors included in the battery charger 1000. The control circuit 10 further includes a unit for reading voltages across the capacitors 105, 502, and 903.

In the first time period, the control circuit 10 performs control to turn on and off the transistor 103 included in the power factor correction circuit 1 so that the voltage across the capacitor 105 becomes 380 V. The control circuit 10 also performs control to turn on and off each of the transistors 201 to 204 included in the DC/AC inverter 2 so that the voltage across the capacitor 502 becomes a voltage corresponding to the state of charge of the main battery MBA.

Regarding control over the secondary side circuit 4, the control circuit 10 performs control so that each of the transistors 401 to 404 included in the secondary side circuit 4 is basically off except for a time period for which the above-mentioned special control is performed. As a result, rectification using body diodes of the transistors 401 to 404 is performed.

The control circuit 10 further controls the conduction angle adjustment circuit 7 to switch between the conductive state and the non-conductive state by performing control to turn on and off each of the transistors 701 and 702 included in the conduction angle adjustment circuit 7, so that the voltage across the capacitor 903 becomes 14 V, for example. The control circuit 10 performs control so that the conduction angle adjustment circuit 7 is in the conductive state when the special control is performed by the secondary side circuit 4. The choke coil short circuit 6 is opened.

In the second time period, the control circuit 10 performs control to turn on and off each of the transistors 401 to 404 included in the secondary side circuit 4 so that the voltage across the capacitor 903 becomes 14 V. The control circuit 10 also performs control to turn off each of the transistors 103, 201 to 204 so that the power factor correction circuit 1 and the DC/AC inverter 2 are in the stop state. The control circuit 10 also performs control to short-circuit the choke coil short circuit 6, and to turn on each of the transistors 701 and 702 included in the conduction angle adjustment circuit 7, so that the AC voltage induced in the second secondary winding 303 is supplied to the sub-battery SBA.

[Operation of Battery Charger]

<First Time Period>

(Overview)

Figure 2:
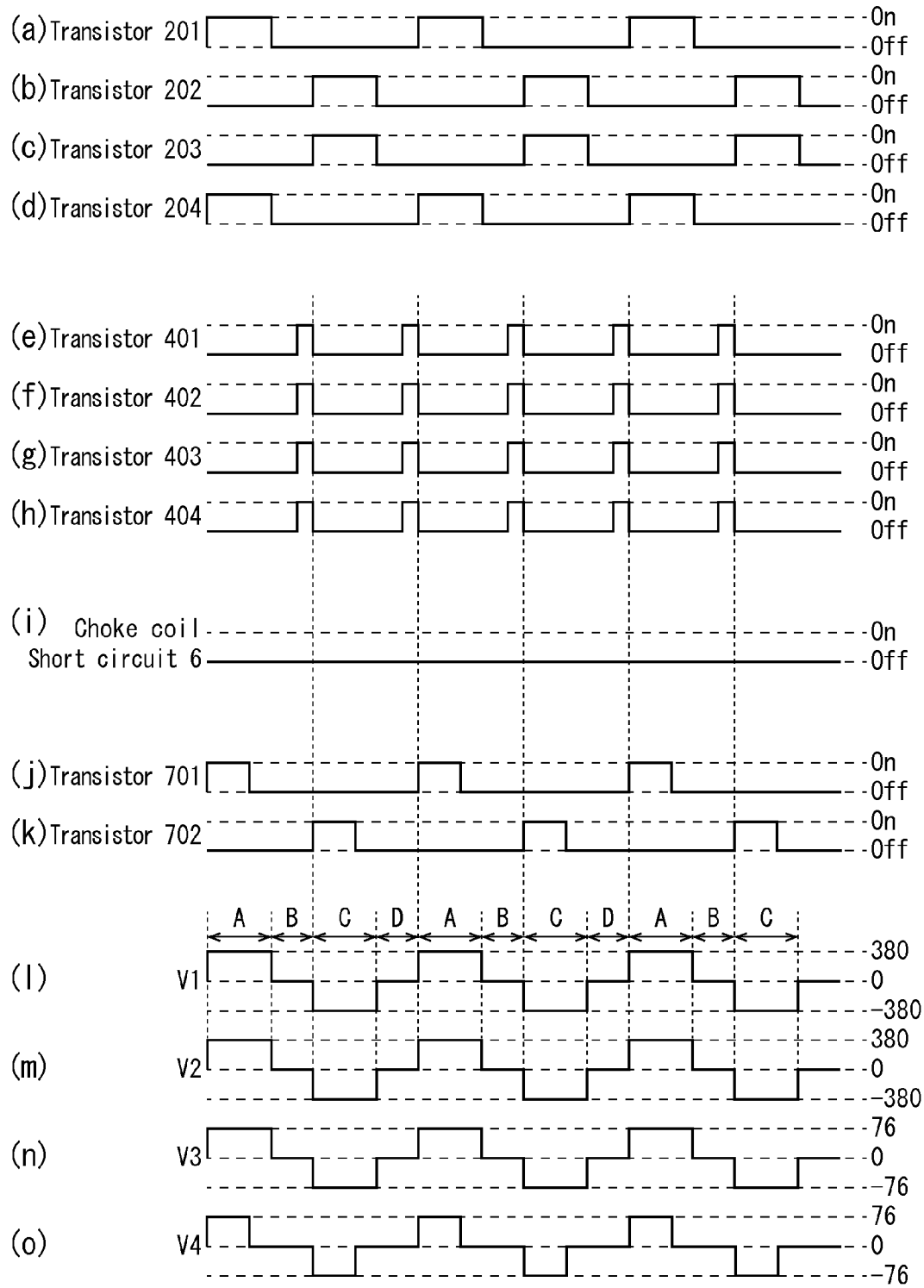
FIG. 2 shows, in (a) through (o), a timing diagram in a first time period pertaining to Embodiment 1.

FIG. 2 shows a timing diagram in the first time period pertaining to Embodiment 1.

FIG. 2 shows a timing diagram in the first time period pertaining to Embodiment 1.

FIG. 2 respectively shows, in (a), (b), (c), and (d), waveforms of control signals for the transistors 201, 202, 203, and 204 output from the control circuit 10. FIG. 2 respectively shows, in (e), (f), (g), and (h), waveforms of control signals for the transistors 401, 402, 403, and 404 output from the control circuit 10. FIG. 2 shows, in (i), a waveform of a control signal for the choke coil short circuit 6. FIG. 2 respectively shows, in (j) and (k), waveforms of control signals for the transistors 701 and 702. FIG. 2 respectively shows, in (l), (m), (n), and (0), a change in a voltage V1 induced in the primary winding 301 (voltage across the primary winding 301), a change in a voltage V2 induced in the first secondary winding 302 (voltage across the first secondary winding 302), a change in a voltage V3 induced in the second secondary winding 303 (voltage across the second secondary winding 303), and a change in a voltage V4 after passing through the conduction angle adjustment circuit 7. The voltages V1 to V4 are also shown in FIG. 1.

As shown in (a), (b), (c), and (d) of FIG. 2, the control circuit 10 controls the on-duty of the transistors 201 to 204 so that the voltage across the capacitor 502 becomes the voltage corresponding to the state of charge of the main battery. As a result, a voltage having a waveform shown in (l) of FIG. 2 is applied to the primary winding 301. The peak value of the voltage V1 depends on an output voltage of the power factor correction circuit 1, and is 380 V here.

In the first time period, the secondary side circuit 4 performs the rectification using the body diodes. To this end, each of the transistors 401 to 404 is basically off, except for some time periods, as shown in (e), (f), (g), and (h) of FIG. 2. For the "some time periods", the above-mentioned special control is performed.

In the first time period, since the choke coil short circuit 6 is opened, the choke coil short circuit is in an off state as shown in (i) of FIG. 2.

Voltages having waveforms shown in (m) and (n) of FIG. 2 are respectively induced in the first secondary winding 302 and the second secondary winding 303. The peak value of the voltage V2 depends on the turns ratio of the primary winding 301 to the first secondary winding 302. As described above, in the present embodiment, since the turns ratio of the primary winding 301 to the first secondary winding 302 is 5:5, the peak value of the voltage V2 is 380 V, as with the voltage V1.

The peak value of the voltage V3 depends on the turns ratio of the primary winding 301 to the second secondary winding 303. As described above, since the turns ratio of the primary winding 301 to the second secondary winding 303 is 5:1, the peak value of the voltage V3 is 76 V (=380/5 V).

As shown in (j) and (k) of FIG. 2, the control circuit 10 controls the on-duty of the transistors 701 and 702 so that the voltage across the capacitor 903 becomes 14V. In this case, control is performed to cause the conduction angle adjustment circuit 7 to be in the conductive state, i.e., to turn on each of the transistors 701 and 702 included in the conduction angle adjustment circuit 7, when the special control is performed by the secondary side circuit 4. As shown in (o) of FIG. 2, the voltage V4 after passing through the conduction angle adjustment circuit 7 has the same peak value as the voltage V3, but has a waveform with a narrower conduction angle than the voltage V3.

(Detailed Operation of Secondary Side Circuit 4)

The following describes the special control performed by the secondary side circuit 4, which characterizes the present embodiment.

Figure 3:
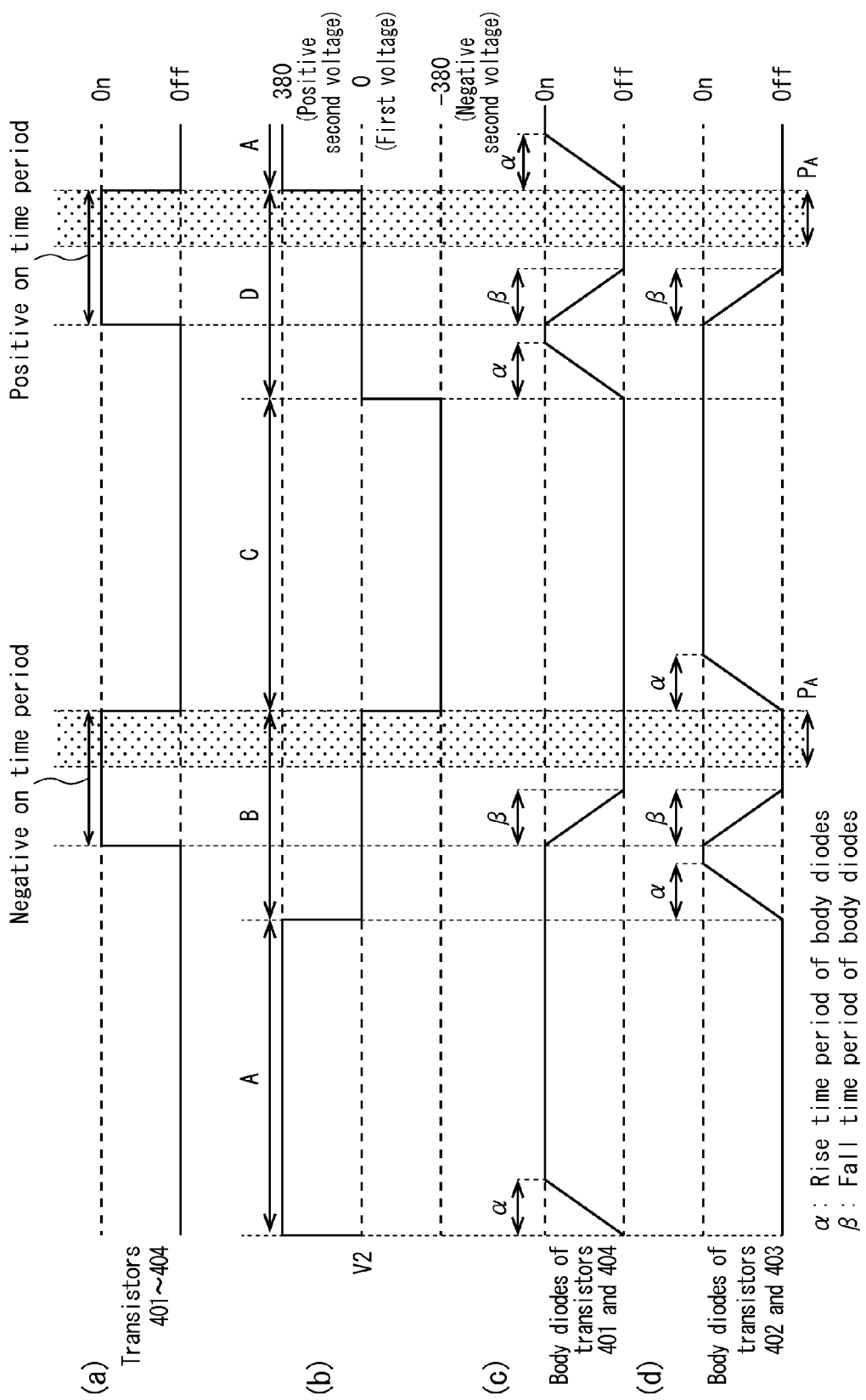
FIG. 3 shows, in (a) and (b), an enlarged view of characterizing portions of the timing diagram shown in FIG. 2, and respectively shows, in (c) and (d), a state of body diodes of transistors 401 and 404 and a state of body diodes of transistors 402 and 403, in association with a waveform of control signals for the transistors 401 to 404 ((a) of FIG. 3) and a change in a voltage V2 ((b) of FIG. 3).

FIG. 3 shows, in (a) and (b), an enlarged view of characterizing portions of the timing diagram shown in FIG. 2. FIG. 3 shows, in (a), a waveform of control signals for the transistors 401 to 404 output from the control circuit 10, and (a) of FIG. 3 corresponds to (e) through (h) of FIG. 2. In the first time period in the present embodiment, the control signals for the transistors 401 to 404 have a common waveform. The control signals for the transistors 401 to 404 are thus collectively shown in (a) of FIG. 3. FIG. 3 shows, in (b), the voltage V2, and (b) of FIG. 3 corresponds to (m) of FIG. 2.

As shown in FIGS. 2 and 3, a time period from a time point when the voltage V2 transitions from 0 V to 380 V to a time point when the voltage V2 transitions from 380 V to 0 V is hereinafter referred to as a time period A. A time period from the time point when the voltage V2 transitions from 380 V to 0 V to a time point when the voltage V2 transitions from 0 V to −380 V is hereinafter referred to as a time period B. A time period from the time point when the voltage V2 transitions from 0 V to −380 V to a time point when the voltage V2 transitions from −380 V to 0 V is hereinafter referred to as a time period C. Finally, a time period from the time point when the voltage V2 transitions from −380 V to 0 V to the time point when the voltage V2 transitions from 0 V to 380 V is hereinafter referred to as a time period D.

That is to say, the time period A is a time period for which the positive second voltage, which is the finite value above the first voltage (0 V), is induced in the first secondary winding 302, and the time period C is a time period for which the negative second voltage, which is the finite value below the first voltage (0 V), is induced in the first secondary winding 302. The time periods B and D are time periods for which the first voltage (0 V) is induced in the first secondary winding 302.

In the present embodiment, as shown in (e), (f), (g), and (h) of FIG. 2 and FIG. 3, each of the transistors 401 to 404 of the secondary side circuit 4 is on for a predetermined time period, within the time periods for which the first voltage is induced in the first secondary winding 302, that includes part or whole of a time period $P_A$ and is equal to or longer than the fall time β of the body diode. The time period $P_A$ is the rise time α of the body diodes of the transistors 401 to 404 back from the time point when the voltage induced in the first secondary winding 302 transitions from the first voltage to the second voltage.

The predetermined time period for which each of the transistors 401 to 404 is on is hereinafter referred to as an on time period. Hereinafter, the rise time α of the body diodes of the transistors 401 to 404 is simply referred to as the rise time α, and the fall time β of the body diodes of the transistors 401 to 404 is simply referred to as the fall time β.

The on time period is a secondary side on time period within the time periods for which the first voltage is induced in the first secondary winding 302, i.e., within the time periods B and D. The on time period includes a negative on time period within the time period B and a positive on time period within the time period D. In the present embodiment, the negative on time period includes whole of the time period $P_A$ that is the rise time α back from a time point when the voltage V2 transitions from the first voltage to the negative second voltage. On the other hand, in the present embodiment, the positive on time period includes whole of the time period $P_A$ that is the rise time α back from a time point when the voltage V2 transitions from the first voltage to the positive second voltage.

In the present embodiment, for the negative and positive on time periods, each of the transistors 401 to 404 of the secondary side circuit 4 is on. By performing such control, the surge voltage generated in the first secondary winding 302 can be lowered.

The following describes the rise time α with use of FIG. 4. FIG. 4 is a timing diagram for explaining characteristics of the body diodes of the transistors 401 to 404. FIG. 4 shows a state of the transistors 401 to 404 in (a), and shows a state of the body diodes of the transistors 401 to 404 in (b). In order to explain characteristics of the body diodes, a time period for which each of the transistors 401 to 404 is off is shown, as can be seen in (a) of FIG. 4.

Hereinafter, the characteristics of the body diodes are explained by using terms "forward bias" and "reverse bias". The forward bias and the reverse bias referred to in the present description mean a forward bias and a reverse bias with respect to the transistors unless otherwise specified. Note that the forward bias with respect to the transistors corresponds to the reverse bias with respect to the diodes, and the reverse bias with respect to the transistors corresponds to the forward bias with respect to the diodes. Similarly, terms "forward direction" and "reverse direction" mean a forward direction and a reverse direction with respect to the transistors unless otherwise specified.

As shown in (b) of FIG. 4, the body diodes are off when the forward bias is applied to the transistors, but is on when the reverse bias is applied to the transistors. The body diodes, however, do not completely rise immediately upon transition from the forward bias to the reverse bias. A predetermined time period is required until the body diodes have completely risen, i.e., until the body diodes have turned on. The time period required until the body diodes of the transistors 401 to 404 have completely risen is referred to as the rise time α. The rise time of the body diodes varies depending on the specification for the transistors, constant of other circuit elements, and the like. A state in which the body diodes have completely risen does not include a state in which the body diodes are transitioning from an off state to the on state.

Similarly, a predetermined time period is required until the body diodes have completely fallen, i.e., until the body diodes have turned off. The time period required until the body diodes of the transistors 401 to 404 have completely fallen is referred to as the fall time β. The fall time of the body diodes varies depending on the specification for the transistors, constant of other circuit elements, and the like. A state in which the body diodes have completely fallen does not include a state in which the body diodes are transitioning from the on state to the off state.

(Principle of Lowering Surge Voltage)

Ideal flows of current through the power converter in the first time period are described next with use of FIGS. 5A, 5B, 6A, and 6B.

FIGS. 5A, 5B, 6A, and 6B show the ideal flows of current through the power converter in the first time period. FIGS. 5A, 5B, 6A, and 6B respectively show flows of current for the time period A, for time period B, for time period C, and for time period D, shown in FIG. 2. In each of FIGS. 5A, 5B, 6A, and 6B, leakage inductance of the first secondary winding 302 is represented by a reference sign "Le".

As shown in FIG. 5A, for the time period A, current flows along a route passing through the first secondary winding 302, the leakage inductance Le, the body diode of the transistor 401, the choke coil 501, the capacitor 502, and the body diode of the transistor 404 in that order. As shown in FIG. 5B, for the time period B, current flows along a route passing through the choke coil 501, the capacitor 502, the body diode of the transistor 402, and the body diode of the transistor 401 in that order, and along a route passing through the choke coil 501, the capacitor 502, the body diode of the transistor 404, and the body diode of the transistor 403 in that order.

As shown in FIG. 6A, for the time period C, current flows along a route passing through the first secondary winding 302, the body diode of the transistor 403, the choke coil 501, the capacitor 502, the body diode of the transistor 402, and the leakage inductance Le in that order. As shown in FIG. 6B, for the time period D, current flows along the route passing through the choke coil 501, the capacitor 502, the body diode of the transistor 402, and the body diode of the transistor 401 in that order, and along the route passing through the choke coil 501, the capacitor 502, the body diode of the transistor 404, and the body diode of the transistor 403 in that order.

The states shown in FIGS. 5A, 5B, 6A, and 6B are ideally repeated in that order. In practice, however, the states shown in FIGS. 5A, 5B, 6A, and 6B are not simply repeated in that order, and current might flow along a route different from the routes shown in FIGS. 5A, 5B, 6A, and 6B at the moment of transition from the time period D to the time period A and the moment of transition from the time period B to the time period C. The following describes flow of current by taking the moment of transition from the time period D to the time period A as an example.

Figure 7A:
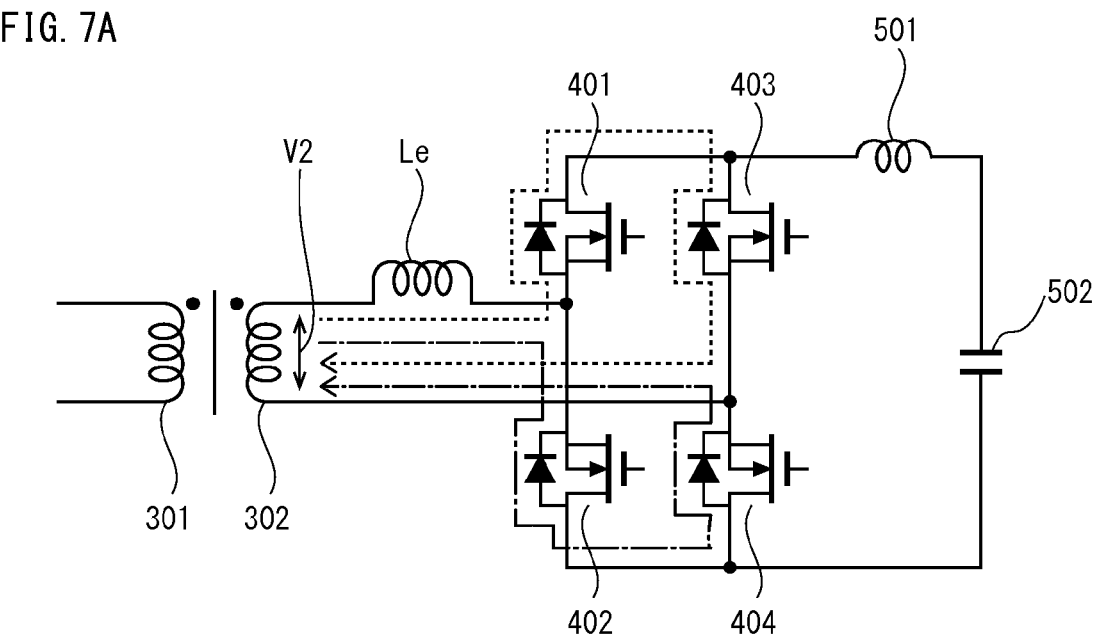
FIGS. 7A and 7B show actual flows of current through the power converter in the first time period.
Figure 7B:
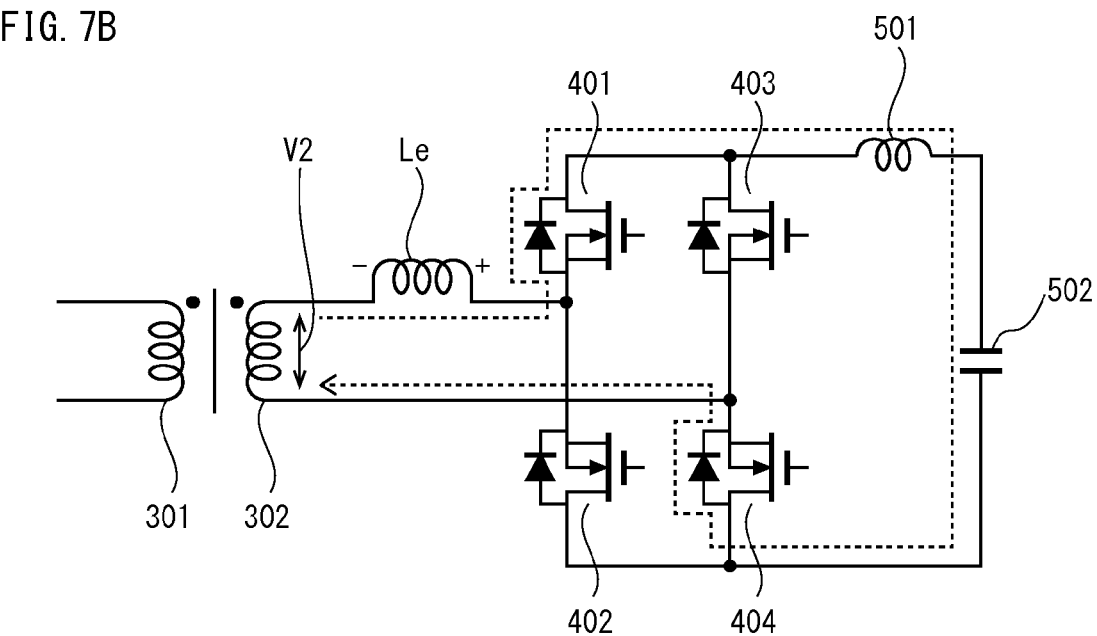

FIGS. 7A and 7B show actual flows of current through the power converter in the first time period.

FIG. 7A shows actual flows of current through the power converter at the moment of transition from the time period D to the time period A. At the moment of transition from the time period D to the time period A, that is, at the moment the voltage V2 transitions from 0 V to 380 V, a short-circuit current flows along a route passing through the first secondary winding 302, the leakage inductance Le, the body diode of the transistor 401, and the body diode of the transistor 403 in that order, as shown by a short dashed line. The short-circuit current shown by the short dashed line is also referred to as a recovery current, and flows backward into the body diode of the transistor 403. As shown by an alternate long and short dash line, a short-circuit current also flows along a route passing through the first secondary winding 302, the leakage inductance Le, the body diode of the transistor 402, and the body diode of the transistor 404 in that order. The short-circuit current shown by the alternate long and short dash line flows backward into the body diode of the transistor 402.

The short-circuit current itself flows even when a fast recovery diode such as a Schottky barrier diode is used. The body diodes of the transistors, however, not only are a bipolar type but also require a long recovery time. Thus, an especially large amount of short-circuit current flows through the body diodes of the transistors for a long time.

The recovery time is briefly described below. A case of switching from the forward bias to the reverse bias with respect to the diode (switching from the reverse bias to the forward bias with respect to the transistor) is considered. When the reverse bias with respect to the diode is applied, current does not flow through the diode in principle. In practice, however, even when the reverse bias with respect to the diode is applied, current in the reverse direction with respect to the diode (current in the forward direction with respect to the transistor) flows through the diode for a while. The current as described above is the short-circuit current, and a time period for which the short-circuit current flows is the recovery time. The recovery time occurs largely due to minority carriers found in the diode, and this is called the minority carrier storage effect.

FIG. 7B shows a flow of current through the power converter after the time period for which the short-circuit current flows. After all the short-circuit current has flowed, the flow of current returns to an ideal state (a state for the time period A as shown in FIG. 5A) as shown in FIG. 7B. When the flow of current returns to the ideal state, however, a voltage having a polarity "+" and "−" as shown in FIG. 7B is generated in the leakage inductance Le so as to release energy having stored in the leakage inductance Le within the time period for which the short-circuit current flows. Since the generated voltage is added to the voltage V2 induced in the first secondary winding 302 for the time period A, the surge voltage is generated in the first secondary winding 302. As described above, when the body diodes of the transistors are used as the diodes, an especially large amount of short-circuit current flows through the diodes, and energy stored in the leakage inductance Le increases accordingly. As a result, a high surge voltage is generated in the first secondary winding 302. The high surge voltage can cause noise generated from the power converter.

FIGS. 7A and 7B show the flows of current at the moment of transition from the time period D to the time period A. Although not specifically shown, at the moment of transition from the time period B to the time period C, the short-circuit current flows in the opposite direction and the voltage generated in the leakage inductance Le has the opposite polarity to those shown in FIGS. 7A and 7B.

The present inventors have assumed that the large amount of short-circuit current is generated due to the control to allow current to flow through the body diodes of the transistors at the moment or immediately before the voltage V2 induced in the first secondary winding 302 transitions from the first voltage to the second voltage. The present inventors have then conceived of the invention of suppressing the surge voltage generated in the first secondary winding 302 by performing such control that, at the moment or immediately before the voltage V2 transitions from the first voltage to the second voltage, the transistors are on so that current flows not through the body diodes of the transistors but through channels of the transistors.

The "moment or immediately before the voltage V2 transitions from the first voltage to the second voltage" corresponds to the time period, within the time periods for which the first voltage is induced in the transformer, that includes part or whole of the time period that is the rise time of the body diodes of FETs back from the time point when the voltage induced in the transformer transitions from the first voltage to the second voltage, and is equal to or longer than the fall time of the body diodes. In the present embodiment, control over the transistors 401 to 404 is performed so that the on time period includes the time period corresponding to the "moment or immediately before the voltage V2 transitions from the first voltage to the second voltage". The principle of suppressing the surge voltage generated in the first secondary winding 302 is described with use of FIGS. 3, 8A, and 8B.

FIG. 3 shows, in (c), a state of the body diodes of the transistors 401 and 404 in association with the waveform of the control signals for the transistors 401 to 404 ((a) of FIG. 3) and the change in the voltage V2 ((b) of FIG. 3). In the present embodiment, the transistors 401 and 404 operate in a similar manner. The operations of the transistors 401 and 404 are thus collectively shown in (c) of FIG. 3. On the other hand, FIG. 3 shows, in (d), a state of the body diodes of the transistors 402 and 403. The transistors 402 and 403 also operate in a similar manner. The operations of the transistors 402 and 403 are thus collectively shown in (d) of FIG. 3.

Figure 8A:
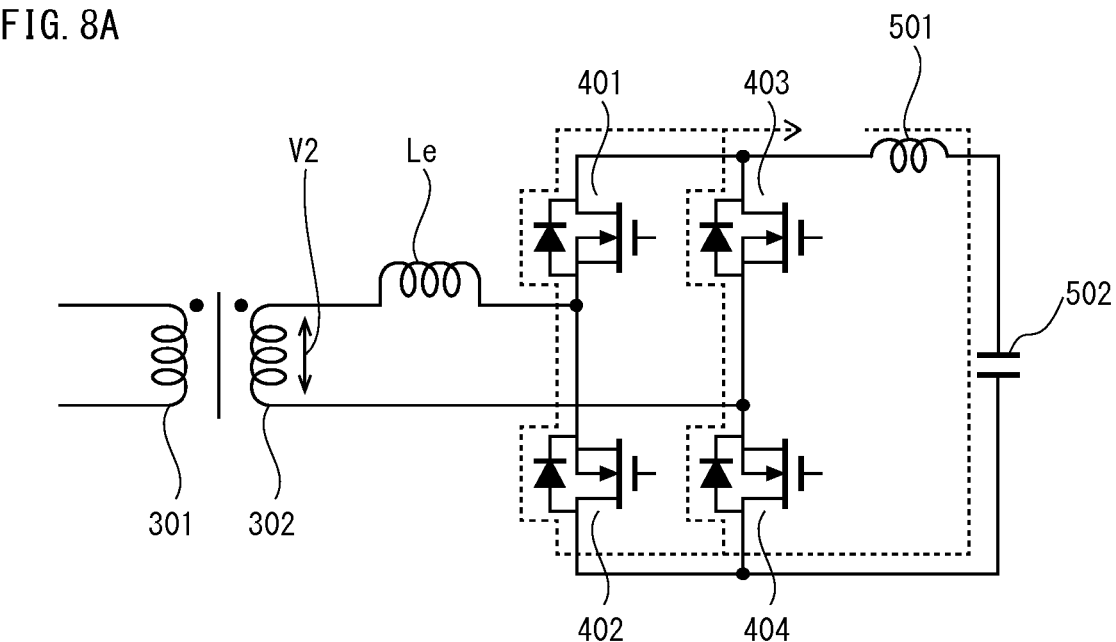
FIG. 8A shows a flow of current through the power converter for a time period from a start of a time period D to a start of a positive on time period.
Figure 8B:
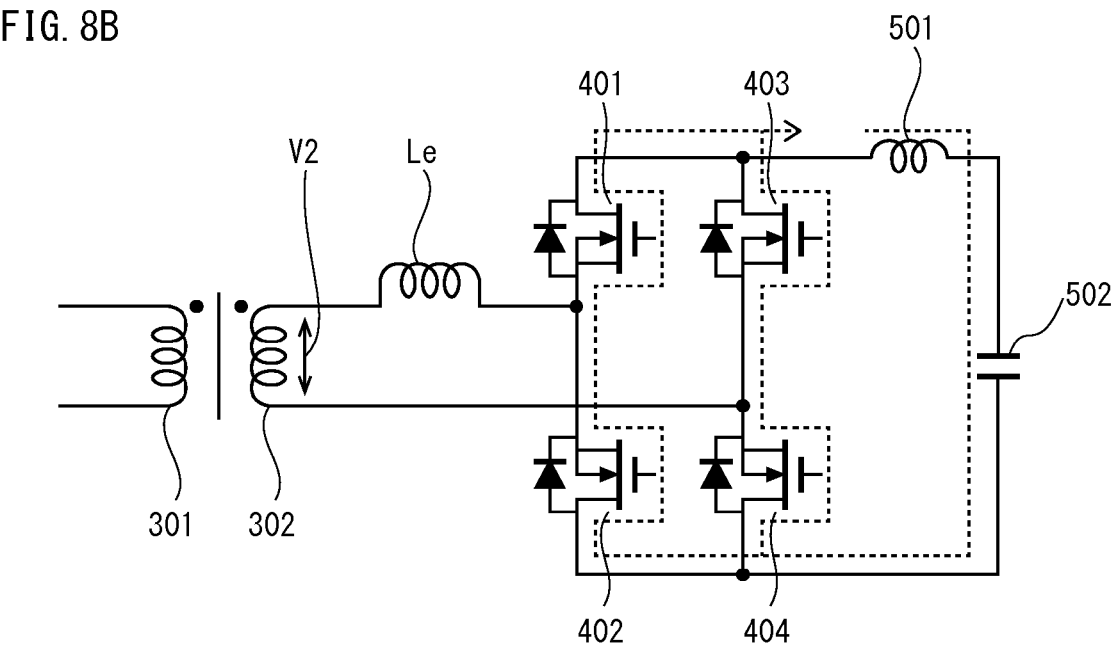
FIG. 8B shows a flow of current through the power converter for the positive on time period.

FIG. 8A shows a flow of current through the power converter for a time period from the start of the time period D to the start of the positive on time period. FIG. 8B shows a flow of current through the power converter for the positive on time period.

As shown in (a) of FIG. 3 and FIG. 8A, for the time period from the start of the time period D to the start of the positive on time period, the body diodes of all the transistors 401 to 404 are on as in the ideal state described with use of FIG. 6B. As shown in (a) of FIG. 3, control is performed so that each of the transistors 401 to 404 is on for the on time period. By turning on each of the transistors 401 to 404, most of the current flowing through the body diodes of the transistors 401 to 404 flows through the channels of the transistors 401 to 404 as shown in (b) of FIG. 8, as the channels typically have a lower on-resistance than the body diodes. As a result, as shown in (c) and (d) of FIG. 3, the body diodes of the transistors 401 to 404 are off for the negative and positive on time periods. If the voltage V2 transitions from the first voltage to the second voltage (transition from the time period D to the time period A) in a state where little current flows through the body diodes of the transistors 401 to 404, almost no recovery time occurs. If almost no recovery time occurs, the short-circuit current hardly flows. As a result, the energy stored in the leakage inductance Le is significantly reduced, and generation of the high surge voltage in the first secondary winding 302 can be prevented.

Needless to say, for the on time period, current that is in the same direction as a direction in which the current flows through the body diodes of the transistors 401 to 404 flows through the channels of the transistors 401 to 404. That is to say, current in the reverse direction flows through the transistors 401 to 404. In order to allow the current in the reverse direction to flow through the transistors 401 to 404, a drain to source voltage applied to the transistors 401 to 404 is required to be the reverse bias. The expression "the transistors 401 to 404 are on" for the on time period thus means that the transistors 401 to 404 are turned on by being applied with the reverse bias with respect to the transistors 401 to 404 as the drain to source voltage. For time periods, within the time period B and the time period D, other than the on time periods, however, current flows through the body diodes. Thus, the drain to source voltage applied to the transistors 401 to 404 has already been the reverse bias. Accordingly, by simply performing control to turn on the transistors 401 to 404, current in the reverse direction flows through the channels of the transistors 401 to 404.

(On Time Period)

The on time period in the present embodiment at least includes a time period satisfying the following three conditions.

(1) The on time period includes part or whole of the time period for which the voltage V2 induced in the first secondary winding 302 is the first voltage.

(2) The on time period includes part or whole of the time period $P_A$ that is the rise time α back from the time point when the voltage induced in the first secondary winding 302 transitions from the first voltage to the second voltage.

(3) The duration of the on time period is equal to or longer than the duration of fall time β.

The significance of each of the conditions is described below.

The condition (1) should be satisfied because, in the present embodiment, the transistors 401 to 404 are on at the moment of or immediately before the transition from the time period B to the time period C (i.e. within the time period B) and at the moment of or immediately before the transition from the time period D to the time period A (i.e. within the time period D) to prevent current from flowing through the body diodes.

The condition (3) should be satisfied so that the body diodes have completely fallen within the on time period.

The condition (2) has the same meaning as setting the end of the on time period within the time period $P_A$. By setting the end of the on time period within the time period $P_A$, a duration of a time period from the end of the on time period to the end of the time period B and a duration of a time period from the end of the on time period to the end of the time period D each become shorter than the duration of the rise time α of the body diodes. If the body diodes have completely fallen at the end of the on time period, since the condition (2) is satisfied, it is possible to avoid such a situation that the body diodes have completely risen again at the ends of the time period B and the time period D.

Figure 9:
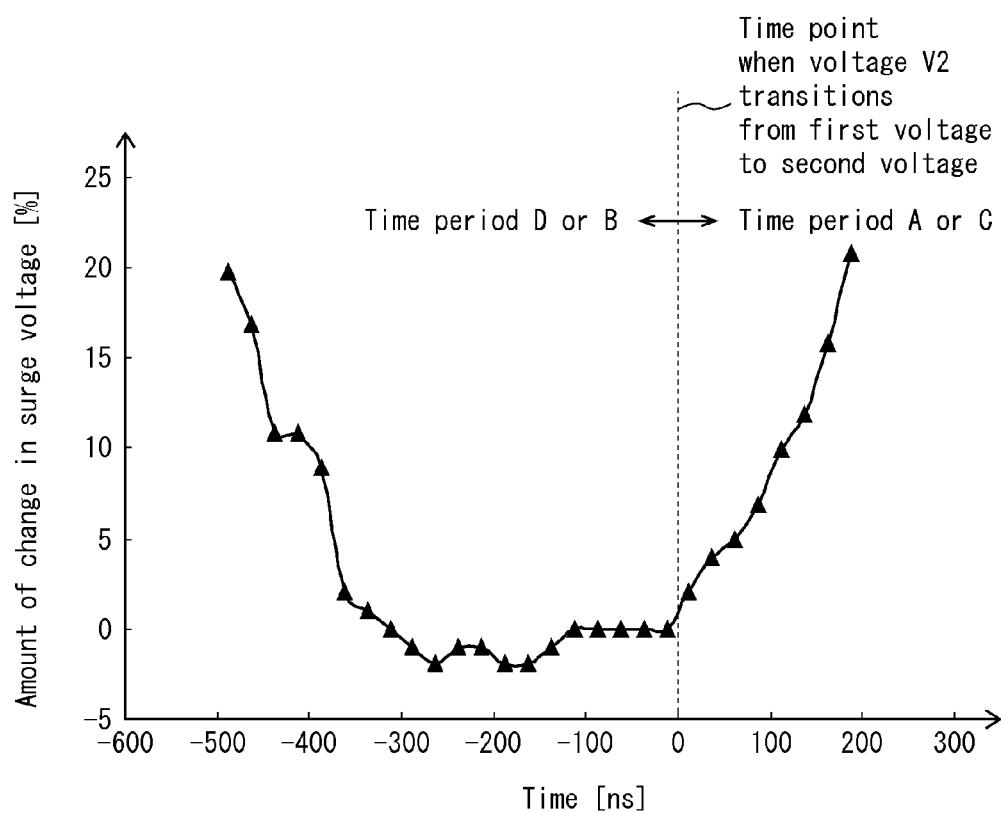
FIG. 9 is a graph showing an amount of change in a surge voltage generated in a first secondary winding when an end of the on time period is varied.

FIG. 9 is a graph showing an amount of change in the surge voltage generated in the first secondary winding when the end of the on time period is varied. In this case, the start of the on time period is fixed to the time point when the voltage V2 transitions from the second voltage to the first voltage (i.e. the time point of transition from the time period A to the time period B and the time point of transition from the time period C to the time period D).

The horizontal axis is a time (ns). A larger positive value on the horizontal axis means that the end of the on time period is set at a later time point, and a larger negative value on the horizontal axis means that the end of the on time period is set at an earlier time point. The value 0 (ns) on the horizontal axis corresponds to the time point when the voltage V2 transitions from the first voltage to the second voltage. Thus, the positive values on the horizontal axis (values on the right side of the short dashed line indicating 0 ns) mean that the end of the on time period is within the time period A or the time period C. On the other hand, the negative values on the horizontal axis (values on the left side of the short dashed line indicating 0 ns) mean that the end of the on time period is within the time period B or the time period D. The vertical axis is an amount of change (%) in the surge voltage with respect to the amount of change in the surge voltage when the value on the horizontal axis is 0 (ns).

As can be seen from the graph of FIG. 9, when the end of the on time period is set at a time point indicated by a positive value, the amount of change in the surge voltage increases sharply. Presumably, this is because the energy stored in the leakage inductance increases due to high current flowing through the channels of the transistors. In light of this, in the present embodiment, the end of the on time period is set at the time point when the voltage V2 transitions from the first voltage to the second voltage.

Figure 10:
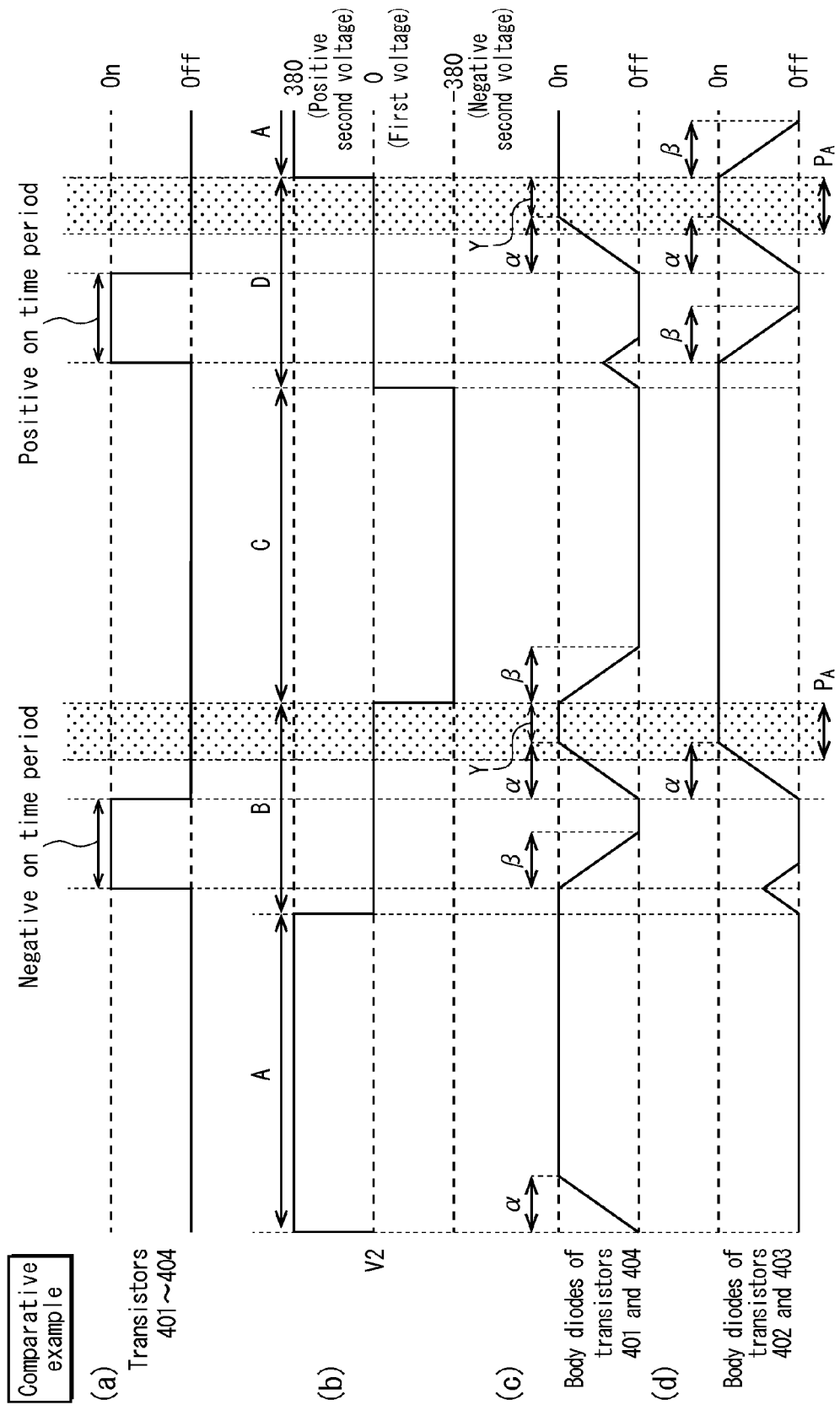
FIG. 10 shows, in (a) through (d), a timing diagram pertaining to a comparative example.

A case where control is performed as shown in a timing diagram pertaining to a comparative example of FIG. 10 is considered. As in FIG. 3, FIG. 10 shows, in (a), the waveform of control signals for the transistors 401 to 404 output from the control circuit 10, shows, in (b), the voltage V2 induced in the first secondary winding 302, shows, in (c), the state of the body diodes of the transistors 401 and 404, and shows, in (d), the state of the body diodes of the transistors 402 and 403.

As shown in (a) of FIG. 10, in the present comparative example, the on time period is set before the time point that is the rise time α back from the time point when the voltage V2 transitions from the first voltage to the second voltage. In this case, when the rise time α has passed since the end of the on time period, the body diodes of the transistors 401 to 404 have completely risen, and are on again. As a result, a time period Y for which current flows through the body diodes might occur at or near the ends of the time period B and the time period D for which the voltage V2 is the first voltage. At the moment the voltage V2 transitions from the first voltage to the second voltage, i.e., at the moment of transition from the time period D to the time period A and the moment of transition from the time period B to the time period C, the body diodes of the transistors 401 to 404 are thus on. This is the same case as the case where the high surge voltage is generated in the first secondary winding 302, as described with use of FIGS. 7A and 7B.

On the other hand, when the end of the on time period is set within the time period $P_A$ that is the rise time α back from the time point when the voltage V2 transitions from the first voltage to the second voltage, the body diodes start rising again after the end of the on time period, but have not completely risen at the time point when the voltage V2 transitions from the first voltage to the second voltage. As a result, at the time point when the voltage V2 transitions from the first voltage to the second voltage, a flow of current through the body diodes is suppressed and the surge voltage is suppressed accordingly. In practice, as shown in FIG. 9, it is found that, if the end of the on time period is set within a range of approximately 0 ns to −300 ns, the amount of change in the surge voltage is approximately 0%. However, when the end of the on time period is set to be earlier than the time point indicated by the value −300 (ns), the amount of change in the surge voltage increases sharply. This time range of 300 ns within which the amount of change in the surge voltage is maintained approximately 0% corresponds roughly to the rise time of the body diodes of the transistors used in the experiment pertaining to FIG. 9. Since the rise time of the body diodes varies depending on the specification for the transistors, constant of other circuit elements, and the like, a time period for which the amount of change in the surge voltage is maintained approximately 0% can vary depending on the above-mentioned factors.

(Others)

(1) In FIGS. 2 and 3, the case where the on time period includes whole of the time period $P_A$ is shown. The present embodiment, however, is not limited to such a case. As long as the on time period includes at least part of the time period $P_A$, the effect of lowering the surge voltage generated in the first secondary winding 302 can be obtained, compared to a case where such control is not performed. The above-mentioned case is described below with use of FIG. 11.

Figure 11:
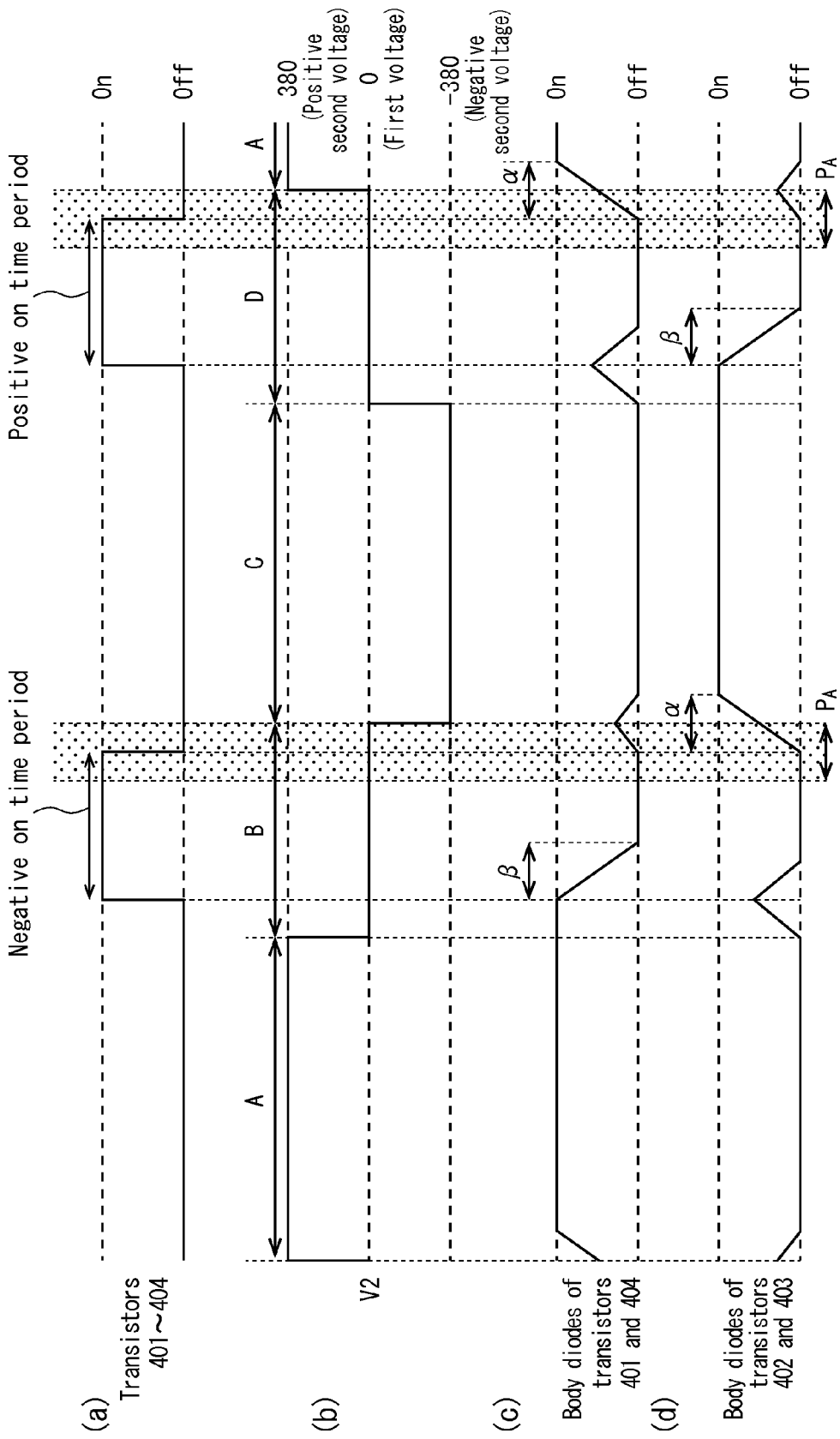
FIG. 11 shows, in (a) through (d), a timing diagram pertaining to another example of Embodiment 1.

FIG. 11 shows a timing diagram pertaining to another example of Embodiment 1. As with FIG. 3, FIG. 11 shows, in (a), the waveform of control signals for the transistors 401 to 404 output from the control circuit 10, shows, in (b), the voltage V2 induced in the first secondary winding 302, shows, in (c), the state of the body diodes of the transistors 401 and 404, and shows, in (d), the state of the body diodes of the transistors 402 and 403.

In this example, the on time period is set to have the same duration as that shown in the example of FIG. 3, but the start of the on time period is set at an earlier time point than that shown in the example of FIG. 3. Even in such a case, as shown in (c) and (d) of FIG. 11, the body diodes of the transistors 401 and 404 have not completely risen at the time point of transition from the time period B to the time period C. The body diodes of the transistors 402 and 403 also have not completely risen at the time point of transition from the time period D to the time period A. Compared to the case where the body diodes have completely risen, less current flows through the body diodes. Compared to a case where the on time period is not provided, the surge voltage is thus lowered.

(2) In the timing diagrams shown in FIGS. 2, 3, and 11, the duration of the on time period is set to be equal to or longer than the duration of the fall time β. In some cases, however, the above-mentioned effect can be obtained when the duration of the on time period is shorter than the duration of the fall time β of the body diode.

Figure 12:
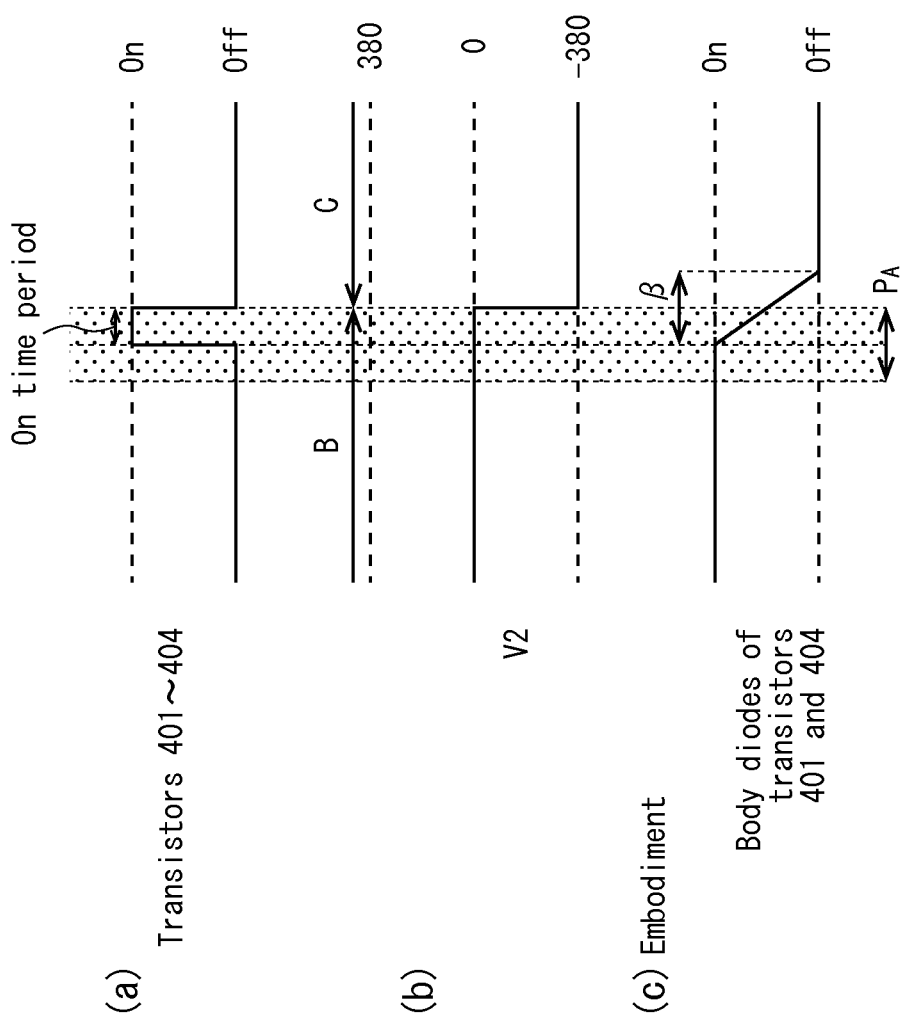
FIG. 12 shows, in (a) through (c), a timing diagram pertaining to yet another example of Embodiment 1.

FIG. 12 is a timing diagram showing the state at and near the time point of transition from the time period B to the time period C. In this case, the duration of the on time period is shorter than the duration of the fall time β of the body diode. Also in this case, the body diodes of the transistors 401 and 404 can be caused to fall to some extent at the end of the time period B. Compared to the case where the on time period is not provided, the surge voltage can thus be lowered.

Figure 13:
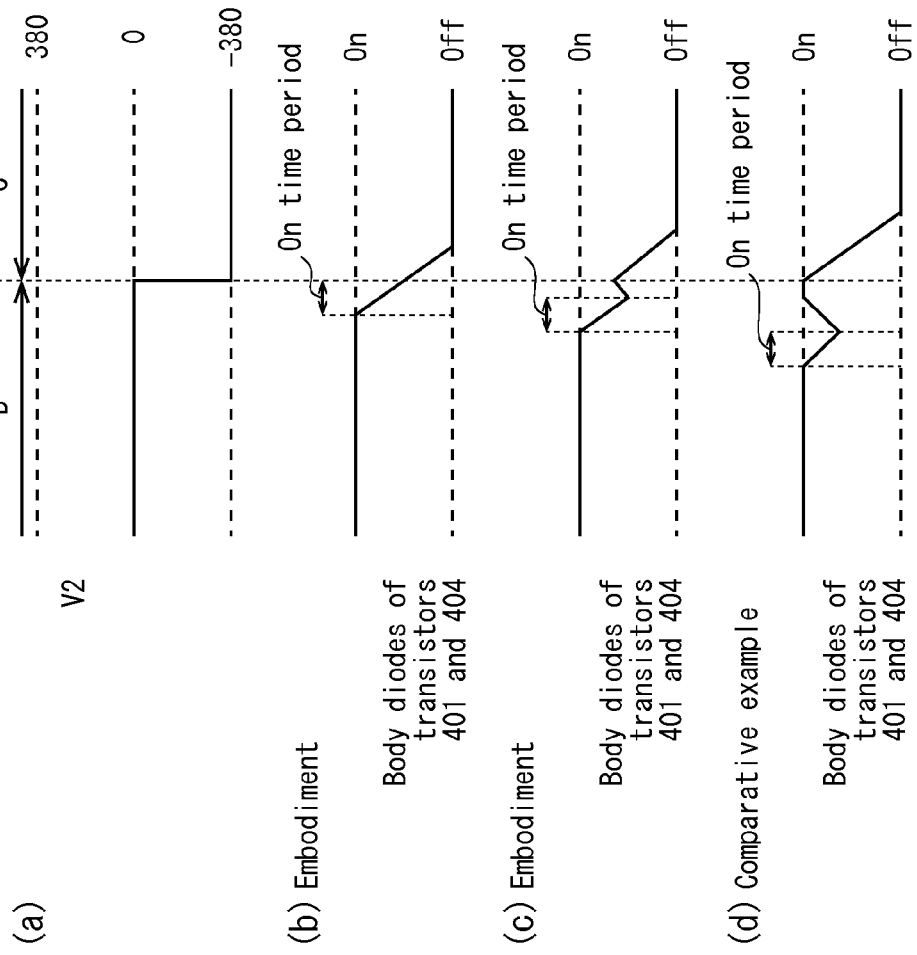
FIG. 13 shows, in (a) through (d), diagrams for examining a timing of setting the on time period.

FIG. 13 shows cases where the on time period is set to have the same duration as that in the example of FIG. 12, but the timing of setting the on time period within the time period B is varied.

FIG. 13 shows, in (b), a case that is the same as the case of FIG. 12.

FIG. 13 shows, in (c), a case where the on time period is set at an earlier time point. In this case, the body diodes of the transistors 401 and 404 rise again for the time period from the end of the on time period to the end of the time period B. However, a fall amount (an amount of decreasing current) of the body diodes for the on time period is greater than a rise amount (an amount of increasing current) of the body diodes after the end of the on time period. The body diodes of the transistors 401 and 404 can thus be caused to fall to some extent at the end of the time period B. Compared to the case where the on time period is not provided, the surge voltage can thus be lowered.

FIG. 13 shows, in (d), a case where the on time period is set at a much earlier time point. In this case, although the body diodes fall to some extent for the on time period, the body diodes start rising again after the on time period, and have completely risen at the end of the time period B. The surge voltage lowering effect thus cannot be obtained.

In view of the foregoing, it is found that the timing of setting the negative on time period within the time period for which the first voltage is induced in the first secondary winding 302 and a duration of the negative on time period should be set so that the fall amount of the body diodes for the negative on time period is greater than the rise amount of the body diodes for the time period from the end of the negative on time period to the time point when the voltage induced in the first secondary winding 302 transitions from the first voltage to the second voltage. As long as the above-mentioned condition is satisfied, the surge voltage lowering effect can be obtained regardless of whether the duration of the negative on time period is equal to or longer than the duration of the fall time β of the body diodes. The following describes the formulas expressing the on time period that can achieve the surge voltage lowering effect with reference to FIGS. 14 and 15.

Figure 14:
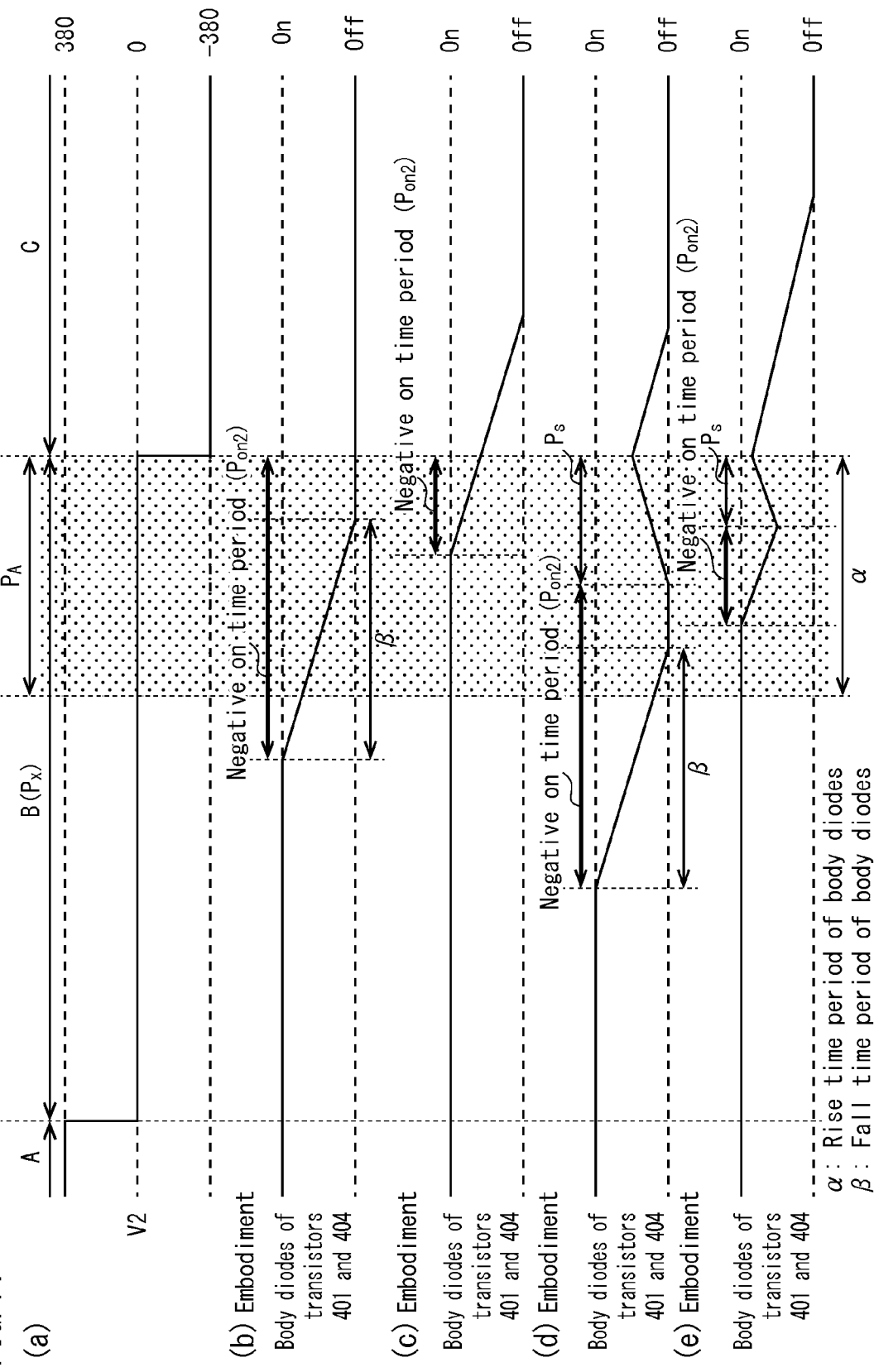
FIG. 14 collectively shows, in (a) through (e), examples of the on time period that can achieve an effect of lowering the surge voltage.

FIG. 14 collectively shows examples of the on time period that can achieve the surge voltage lowering effect. FIG. 14 shows, in (a), the change in the voltage V2 induced in the first secondary winding 302. FIG. 14 shows, in (b) to (e), states of the body diodes of the transistors 401 and 404 in cases where the negative on time period is set so that the surge voltage lowering effect can be obtained, and (b) through (e) of FIG. 14 correspond to the embodiments. The embodiment of (b) of FIG. 14 corresponds to the embodiment of FIG. 3. The embodiment of (c) of FIG. 14 corresponds to the embodiment of FIG. 12 and (b) of FIG. 13. The embodiment of (d) of FIG. 14 corresponds to the embodiment of FIG. 11. Furthermore, the embodiment of (e) of FIG. 14 corresponds to the embodiment of (c) of FIG. 13.

As described above, as long as the body diodes of the transistors 401 and 404 have not completely risen at the time point of transition from the time period B to the time period C, the surge voltage can be lowered. The following describes set conditions of the negative on time period to prevent the body diodes of the transistors 401 and 404 from completely rising at the time point of transition from the time period B to the time period C, with reference to FIG. 14. Hereinafter, in addition to the duration of the rise time α and the duration of the fall time β of the body diodes, the duration of the negative on time period is denoted by $P_{on2}$, the duration of the time period B is denoted by $P_X$, and the duration of the time period from the end of the negative on time period to the time point of transition from the time period B to the time period C is denoted by $P_S$.

First of all, as shown in (b) of FIG. 14, when the duration of the negative on time period $P_{on2}$ is equal to or longer than the duration of the fall time β, i.e., the relation $P_{on2} \geq \beta$ is satisfied, the body diodes of the transistors 401 and 404 have completely fallen at the time point of transition from the time period B to the time period C.

Next, as shown in (c) of FIG. 14, when the end of the negative on time period coincides with the time point of transition from the time period B to the time period C, the effect can be achieved even if the negative on time period is a short time period. That is to say, by satisfying the relation $P_S = 0$ and $P_{on2} > 0$, the body diodes can be prevented from completely rising at the time point of transition from the time period B to the time period C.

Furthermore, as shown in (d) and (e) of FIG. 14, even when the end of the negative on time period does not coincide with the time point of transition from the time period B to the time period C, i.e., the relation $P_S > 0$ is satisfied, the body diodes can be prevented from completely rising at the time point of transition from the time period B to the time period C. To this end, the fall amount of the body diodes for the time period from the start of the negative on time period to the time point of transition from the time period B to the time period C has to be greater than the rise amount of the body diodes.

The fall amount of the body diodes for the negative on time period is expressed as $P_{on2}/\beta$. On the other hand, the rise amount of the body diodes for the time period ($P_S$) from the end of the negative on time period to the time point of transition from the time period B to the time period C is expressed as $P_S/\alpha$. Thus, by satisfying the relation $P_{on2}/\beta > P_S/\alpha$, the body diodes can be prevented from completely rising at the time point of transition from the time period B to the time period C.

If each of the transistors is on within the time period for which the second voltage is induced in the first secondary winding 302, short circuits might be caused between transistors included in each arm. In order to prevent such short circuits, the sum of the duration of the on time period $P_{on2}$ and the duration of the time period $P_S$ is set so as to be equal to or shorter than the duration of the time period B ($P_X$), i.e., the relation $P_{on2} + P_S \leq P_X$ is satisfied. In other words, the start of the negative on time period is set to be at or after the time point when the voltage induced into the first secondary winding 302 transitions from the second voltage to the first voltage.

Figure 15:
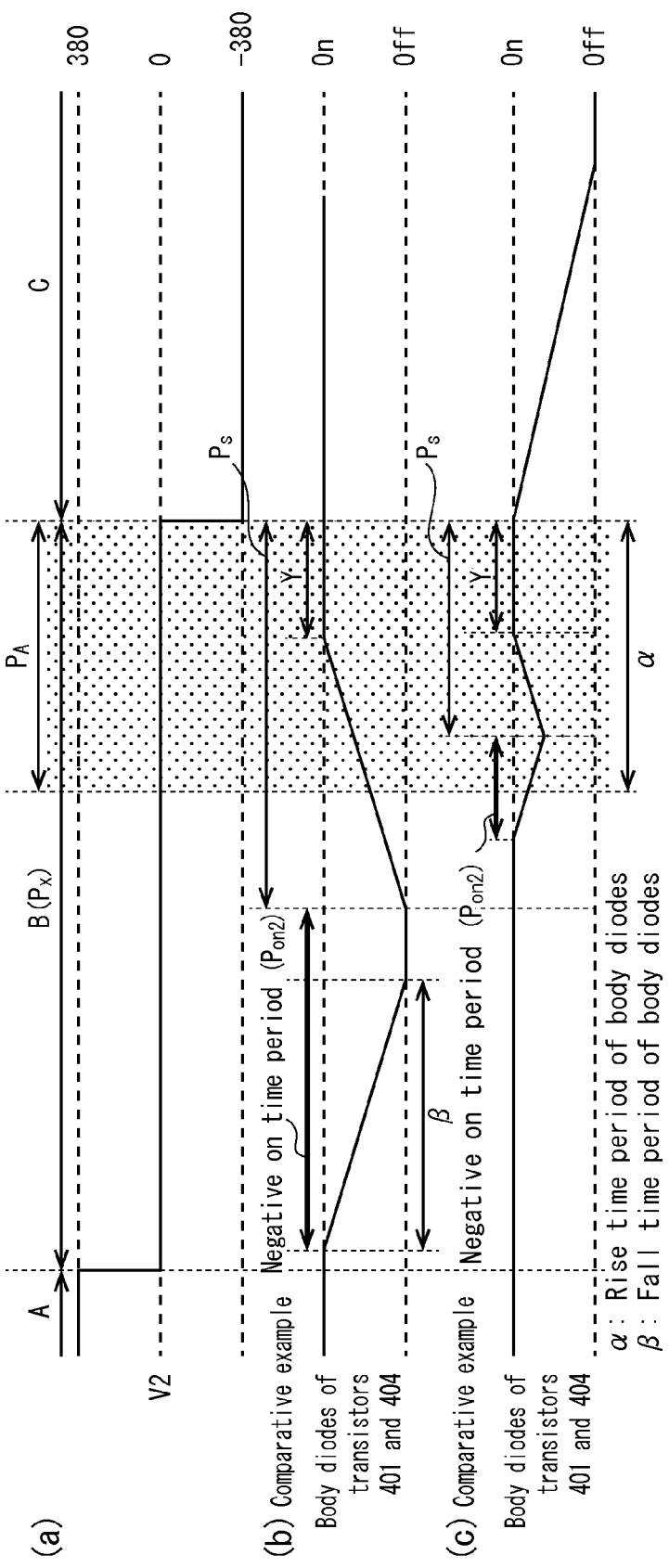
FIG. 15 collectively shows, in (a) through (c), examples of the on time period that cannot achieve the surge voltage lowering effect.

FIG. 15 collectively shows examples of the on time period that cannot achieve the surge voltage lowering effect. FIG. 15 shows, in (a), the change in the voltage V2 induced in the first secondary winding 302. FIG. 15 shows, in (b) and (c), states of the body diodes of the transistors 401 and 404 in cases where the surge voltage lowering effect cannot be achieved, and (b) and (c) of FIG. 15 correspond to the comparative examples. The comparative example of (b) of FIG. 15 corresponds to the comparative example of FIG. 10. The comparative example of (c) of FIG. 15 corresponds to the comparative example of (d) of FIG. 13.

As described with use of (d) and (e) of FIG. 14, the end of the negative on time period may not coincide with the time point of transition from the time period B to the time period C (the relation $P_S > 0$ may be satisfied). If the time period $P_S$ is equal to or longer than the rise time α of the body diodes, however, the body diodes have completely risen at the time point of transition from the time period B to the time period C as shown in (b) of FIG. 15. As a result, the time period Y for which current flows through the body diodes occurs at the end of the time period B. In order to avoid such a situation that the body diodes have completely risen at the time point of transition from the time period B to the time period C, the relation $P_S < \alpha$ should be satisfied.

In the example shown in (c) of FIG. 15, the relation $P_S < \alpha$ is satisfied. However, the fall amount $P_{on2}/\beta$ of the body diodes for the time period from the start of the negative on time period to the time point of transition from the time period B to the time period C is equal to the rise amount $P_S/\alpha$ of the body diodes. That is to say, the on time period is not set so that the above-mentioned relation $P_{on2}/\beta > P_S/\alpha$ is satisfied. As a result, the time period Y for which current flows through the body diodes occurs at the end of the time period B, and the surge voltage lowering effect cannot be obtained.

As described with use of FIGS. 14 and 15, the duration of the on time period $P_{on2}$ should satisfy the relation $P_{on2}/\beta > P_S/\alpha$, i.e., the two relations (A) $P_{on2} > (\beta/\alpha)P_S$ and (C) $P_{on} + P_S \leq P_X$. The time period $P_S$ should further satisfy the relation (B) $0 \geq P_S < \alpha$. The on time period is described to satisfy the relation $P_{on2} \geq \beta$ in the example shown in (b) of FIG. 14 and to satisfy the relation $P_{on2} > 0$ in the example shown in (c) of FIG. 14. These examples are cases where the time period $P_S$ is zero. In each of these examples, the above-mentioned relation (A) is satisfied.

The greater the fall amount of the body diodes at the time point of transition from the time period B to the time period C is, the more the surge voltage can be lowered. From among the embodiments shown in FIG. 14, the embodiment shown in (b) of FIG. 14 is the most effective in reducing the surge voltage. In the example of (b) of FIG. 14, the body diodes have completely fallen at the time point when the voltage induced in the first secondary winding 302 transitions from the first voltage to the second voltage. To this end, in addition to the three relations (A) through (C), two conditions (D) $P_{on2} \geq \beta$ and (E) $P_S=0$ should be satisfied.

Although examination is made with respect to the time point of transition from the time period B to the time period C in FIGS. 12 to 15, it is easy to assume that the same applies to the time point of transition from the time period D to the time period A.

(3) In FIGS. 2, 3, and 11 to 14, each of the transistors included in the first and second arms is on for the on time period. The present embodiment, however, is not limited to such a case. By turning on each of the transistors included in at least one of the first and second arms, the amount of current flowing through the body diodes included in the secondary side circuit 4 as a whole can be reduced, compared to a case where none of the transistors 401 to 404 is turned on. As a result, the surge voltage can be reduced compared to the case where none of the transistors 401 to 404 is turned on.

(4) By devising control over the conduction angle adjustment circuit 7 in addition to the control over the secondary side circuit 4, the surge voltage generated in the first secondary winding 302 can further be suppressed.

Specifically, the timing at which the conduction angle adjustment circuit 7 is turned to the conductive state is synchronized with the timing at which the voltage V2 induced in the first secondary winding 302 transitions from the first voltage to the second voltage, i.e., the end of the on time period. By performing such control, the energy stored in the leakage inductance of the transformer 3 to generate the surge voltage is distributed and released not only into the first secondary winding 302 but also into the second secondary winding 303. As a result, the surge voltage generated in the first secondary winding 302 is lowered, and noise generated from the power converter can thus be further reduced.

FIG. 2 shows the case where the time point when the voltage V2 induced in the first secondary winding 302 transitions from the first voltage to the second voltage coincides with the time point when the conduction angle adjustment circuit is turned to the conductive state. However, by performing control so that the conduction angle adjustment circuit is in the conductive state for a time period at least including the time point when the voltage V2 induced in the first secondary winding 302 transitions from the first voltage to the second voltage, the effect of distributing the surge voltage can be obtained.

<Second Time Period>

Figure 16:
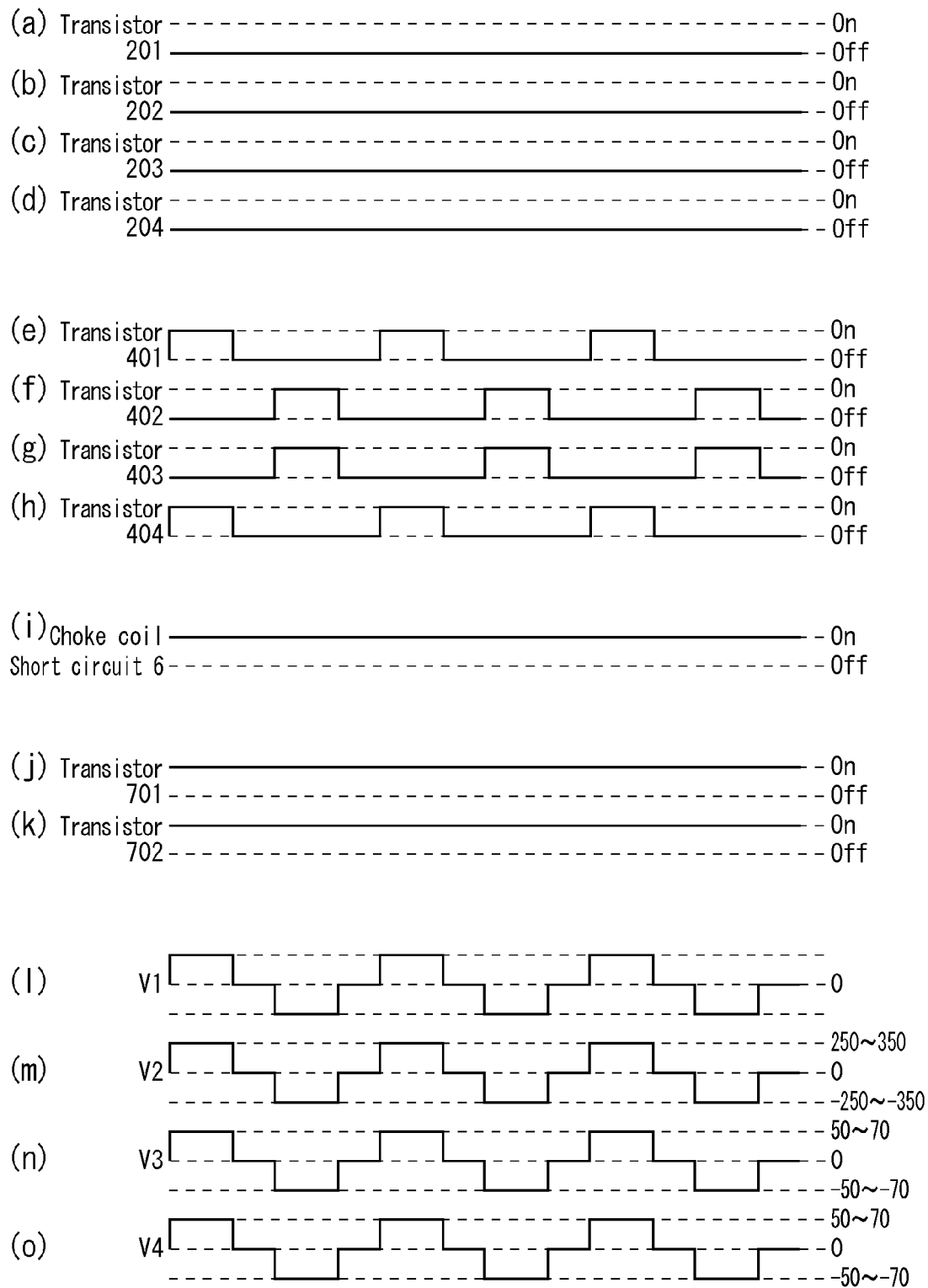
FIG. 16 shows, in (a) through (o), a timing diagram in a second time period pertaining to Embodiment 1.

FIG. 16 shows a timing diagram in the second time period pertaining to Embodiment 1. FIG. 16 respectively shows, in (a), (b), (c), (d), (e), (f), (g), (h), (i), (j), and (k), waveforms of control signals for the transistors 201, 202, 203, 204, 401, 402, 403, and 404, the choke coil short circuit 6, and the transistors 701 and 702 output from the control circuit 10. Waveforms in (l), (m), (n), and (o) of FIG. 16 respectively show changes in the voltage V1, the voltage V2, the voltage V3, and the voltage V4 after passing through the conduction angle adjustment circuit 7.

In the second time period, since the DC/AC inverter 2 are in the stop state, each of the transistors 201 to 204 is off as shown in (a), (b), (c), and (d) of FIG. 16. Since the choke coil short circuit 6 is short-circuited, the choke coil short circuit 6 is on as shown in (i) of FIG. 16.

As shown in (e), (f), (g), and (h) of FIG. 16, the control circuit 10 controls the on-duty of the transistors 401, 402, 403, and 404 so that the voltage across the capacitor 903 becomes 14 V. As a result, a voltage having a waveform shown in (m) of FIG. 16 is induced in the first secondary winding 302. The peak value of the voltage V2 depends on an output voltage of the main battery MBA, and varies within a range of 250 V to 350V depending on a state of charge. Although a voltage having a waveform shown in (l) of FIG. 16 is induced in the primary winding 301 and charges the capacitor 105 via the body diodes of the transistors 201, 202, 203, and 204, this power is ignored as it is extremely low. For the above-mentioned reason, the peak value of the voltage V1 is not indicated in (l) of FIG. 16.

A voltage having a waveform shown in (n) of FIG. 16 is induced in the second secondary winding 303. The peak value of the voltage V3 depends on the turns ratio of the first secondary winding 302 to the second secondary winding 303, and is 50 (=250/5) V to 70 (=350/5) V.

As shown in (j) and (k) of FIG. 16, since the transistors 701 and 702 are on in the second time period, the voltage V4 after passing through the conduction angle adjustment circuit 7 shown in (o) of FIG. 16 is the same as the voltage V3.

Summary

The secondary side circuit 4 included in the battery charger 1000 pertaining to the present embodiment is similar to the secondary side circuit pertaining to Patent Literature 1 in that it converts the DC voltage from the main battery into the AC voltage and supplies the AC voltage to the first secondary winding. In the present embodiment, however, the secondary side circuit 4 is configured as a full-bridge circuit. Although the secondary winding 1003b of the transformer has to have three terminals with the circuit configuration of the battery charger pertaining to Patent Literature 1, the secondary winding 302 of the transformer 3 only has to have two terminals, as the number of input terminals of the full-bridge circuit is two. As described above, in the present embodiment, the number of terminals of the first secondary winding can be reduced, and, as a result, a size of the transformer can be reduced.

Furthermore, in the present embodiment, each of the transistors 401 to 404 included in the secondary side circuit 4 is on for the on time period so that current flows not through the body diodes of the transistors 401 to 404 but through the channels of the transistors 401 to 404. By performing such control, at the moment when the voltage induced in the first secondary winding 302 transitions from the first voltage to the second voltage, a time period for which the short-circuit current flows can be reduced. Since the time period for which the short-circuit current flows is reduced, the energy stored in the leakage inductance of the first secondary winding 302 is also reduced. As a result, the energy added at the moment when the voltage is induced in the first secondary winding 302 is reduced, and the surge voltage generated in the first secondary winding 302 is lowered accordingly. As set forth the above, according to the battery charger pertaining to the present embodiment, a size of the power converter as well as noise generated from the power converter can be reduced.

Embodiment 2

Operation of Battery Charger

Embodiment 2 is different from Embodiment 1 only in the timing diagram in the first time period, and is similar to Embodiment 1 in the configuration of the battery charger (FIG. 1). The following describes Embodiment 2 with reference to FIGS. 1 and 17.

Figure 17:
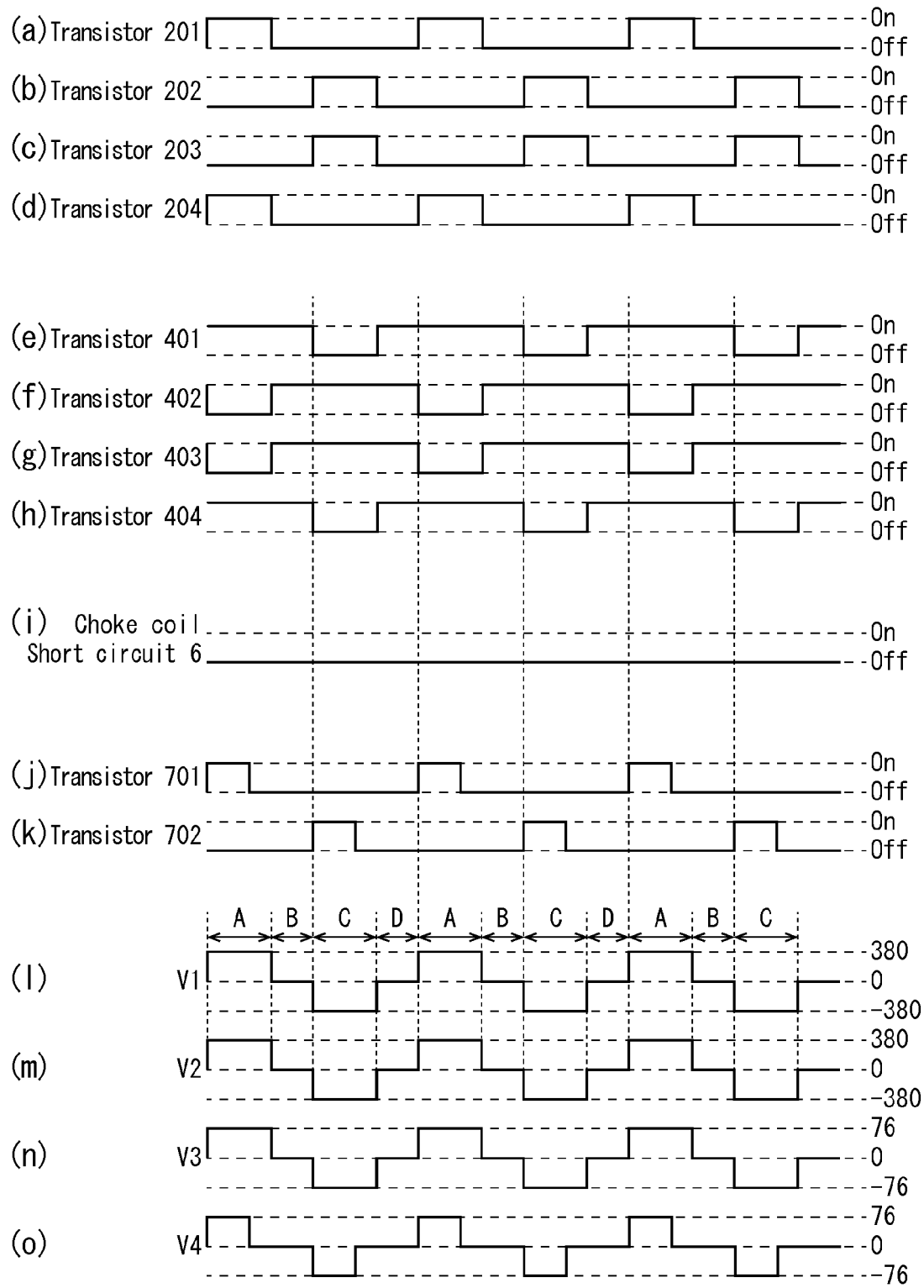
FIG. 17 shows, in (a) through (o), a timing diagram in the first time period pertaining to Embodiment 2.

FIG. 17 shows a timing diagram in the first time period pertaining to Embodiment 2. The timing diagram in the first time period shown in FIG. 17 is different from that shown in FIG. 2 pertaining to Embodiment 1 only in the control over the transistors 401 to 404 included in the secondary side circuit 4. Roughly speaking, the time period for which each of the transistors 401 to 404 is on is increased.

As shown in (e), (f), (g), and (h) of FIG. 17, the control circuit 10 performs control so that the transistors 401 and 404 are on and the transistors 402 and 403 are off for a time period for which the voltage V2 ((m) of FIG. 17) is the positive second voltage. By performing such control, for the time period for which the voltage V2 is the positive second voltage, current flows along a route passing through the first secondary winding 302, the transistor 401, the choke coil 501, the capacitor 502, and the transistor 404 in that order. By turning on the transistors 401 and 404 by applying thereto the reverse bias as the drain to source voltage, current flows not through the body diodes but through the channels of the transistors 401 and 404.

For the time period for which the voltage V2 is the negative second voltage, control is performed so that the transistors 402 and 403 are on and the transistors 401 and 404 are off. By performing such control, current flows along a route passing through the first secondary winding 302, the transistor 403, the choke coil 501, the capacitor 502, and the transistor 402 in that order. Also for this time period, by turning the transistors 402 and 403 on by applying thereto the reverse bias as the drain to source voltage, current flows not through the body diodes but through the channels of the transistors 402 and 403.

In the first time period for which the secondary side circuit 4 performs rectification, in the case of another example of Embodiment 1 shown in FIG. 11, since the transistors 401 to 404 are off for the time period $P_A$ other than the on time period, current flows not through the channels but through the body diodes of the transistors 401 to 404. The body diode incorporated in the transistor typically has a large voltage drop in a forward direction with respect to the body diode, and thus a power loss of the transistor is relatively large. According to the present embodiment, however, current flows not through the body diodes but through the channels of the transistors having a small voltage drop in the forward direction with respect to the body diodes (reverse direction with respect to the transistors). The power loss of each of the transistors can thus be reduced compared to the other examples of Embodiment 1.

Furthermore, as shown in (e), (f), (g), and (h) of FIG. 17, each of the transistors 401 to 404 is on all through the time periods for which the voltage V2 is the first voltage. As described with use of FIGS. 5A, 5B, 6A, and 6B, in the time period for which the voltage V2 is the first voltage, current flows through the route passing through the choke coil 501, the capacitor 502, the body diode of the transistor 402, and the body diode of the transistor 401 in that order (in the time period B), and along the route passing through the choke coil 501, the capacitor 502, the body diode of the transistor 404, and the body diode of the transistor 403 in that order (in the time period D) so as to release energy having stored in the choke coil 501. In the present embodiment, all through the above-mentioned time periods, current flows not through the body diodes but through the channels of the transistors 401 to 404. By performing such control, the power loss of each of the transistors can be further reduced compared to Embodiment 1.

However, it is necessary to appropriately turn off each of the transistors 401 to 404 according to the voltage induced in the first secondary winding 302 of the transformer 3. Specifically, in the time period for which the voltage V2 is the positive second voltage, the transistors 402 and 403 are off to prevent the short-circuit current from flowing through the channels of the transistors 402 and 403. Similarly, in the time period for which the voltage V2 is the negative second voltage, the transistors 401 and 404 are off to prevent the short-circuit current from flowing through the channels of the transistors 401 and 404. That is to say, in the present embodiment, the transistors 402 and 403 are off in the time period for which the voltage V2 is the positive second voltage and are on in the other time period, and the transistors 401 and 404 are off in the time period for which the voltage V2 is the negative second voltage and are on in the other time period.

As set forth the above, in addition to the surge voltage lowering effect described in Embodiment 1, the effect of reducing the power loss in the secondary side circuit can be obtained.

Verification of Surge Voltage Lowering Effect

The present inventors have verified the surge voltage lowering effect of the power converter disclosed in the present description. In the verification, the battery charger pertaining to Embodiment 2 is used to record waveforms of the voltage V1 induced in the primary winding 301 and the voltage V2 induced in the first secondary winding 302 when the battery charger operates according to the timing diagram of FIG. 17. The results of the verification are shown in FIGS. 18A and 18B.

Figure 18A:
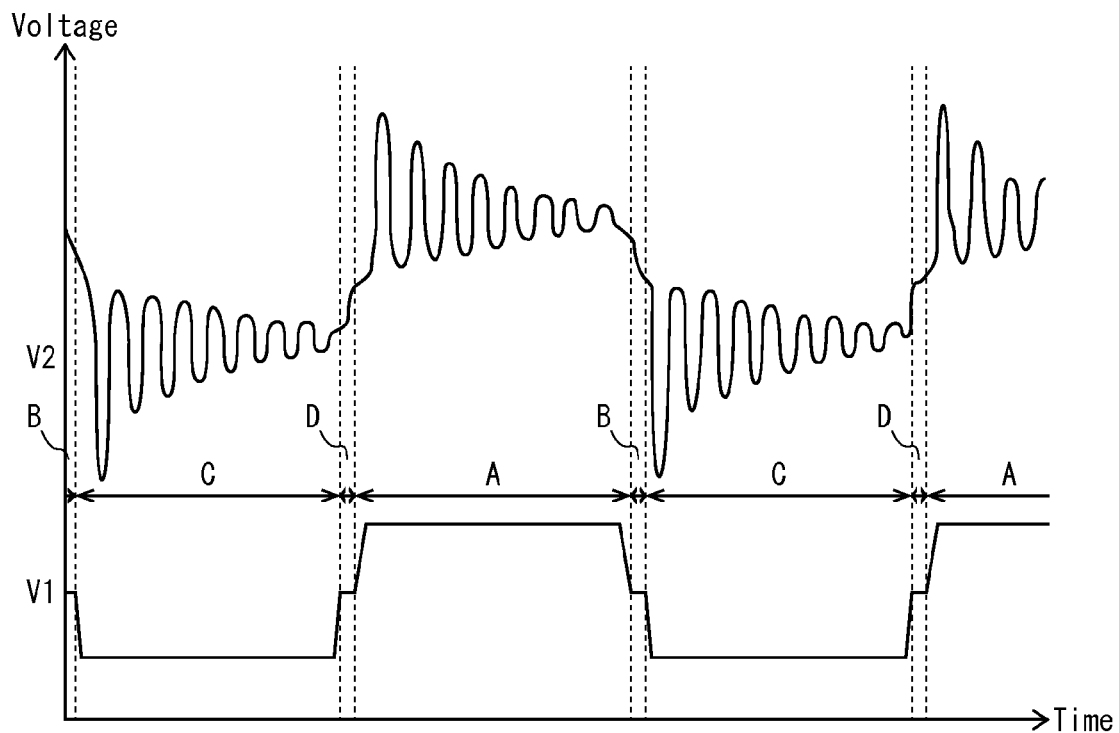
FIG. 18A shows waveforms of a voltage V1 and the voltage V2 when the transistors 401 to 404 are not turned on, and FIG. 18B shows waveforms of the voltages V1 and V2 when a battery charger operates according to the timing diagram of FIG. 17 pertaining to Embodiment 2.

FIG. 18A shows waveforms of the voltages V1 and V2 when the on time period is not provided. FIG. 18B shows waveforms of the voltages V1 and V2 when the battery charger operates according to the timing diagram of FIG. 17 pertaining to Embodiment 2.

Figure 18B:
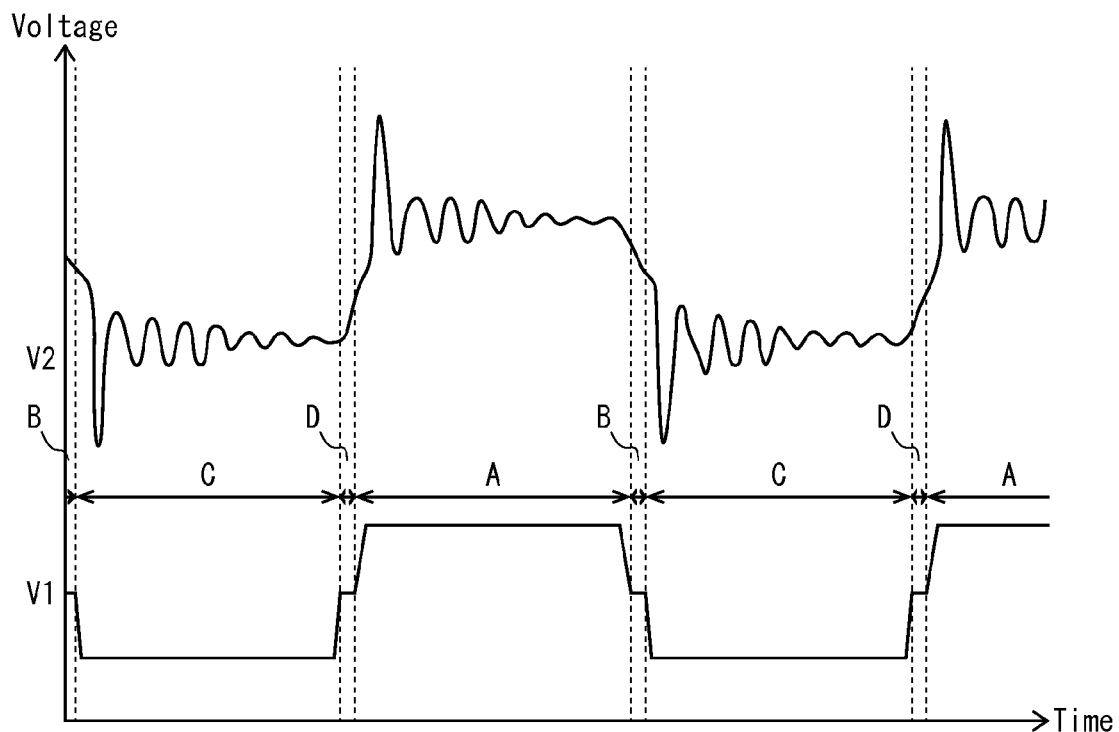

When the waveforms shown in FIG. 18B are compared with those shown in FIG. 18A, it appears that the amplitude of a ringing induced in the first secondary winding decreases at the time point of transition from the time period D to the time period A and at the time point of transition from the time period B to the time period C. It appears that the ringing remains at or near the ends of the time period A and the time period C in FIG. 18A, whereas the ringing has disappeared in FIG. 18B.

This indicates that the surge voltage generated in the first secondary winding can be reduced by turning on the transistors 401 to 404 for the on time period.

Embodiment 3

Described in Embodiments 1 and 2 is the battery charger that charges, in the first time period, the main battery and the sub-battery by using the external power supply, and charges, in the second time period, the sub-battery by using the main battery. Described in the present embodiment is a battery charger that charges a battery in the first time period, and discharges the battery to supply power to the external power supply in the second time period. The battery charger in the present embodiment is used to supply power from the battery loaded in an electric vehicle to a home, for example.

[Configuration of Battery Charger]

Figure 19:
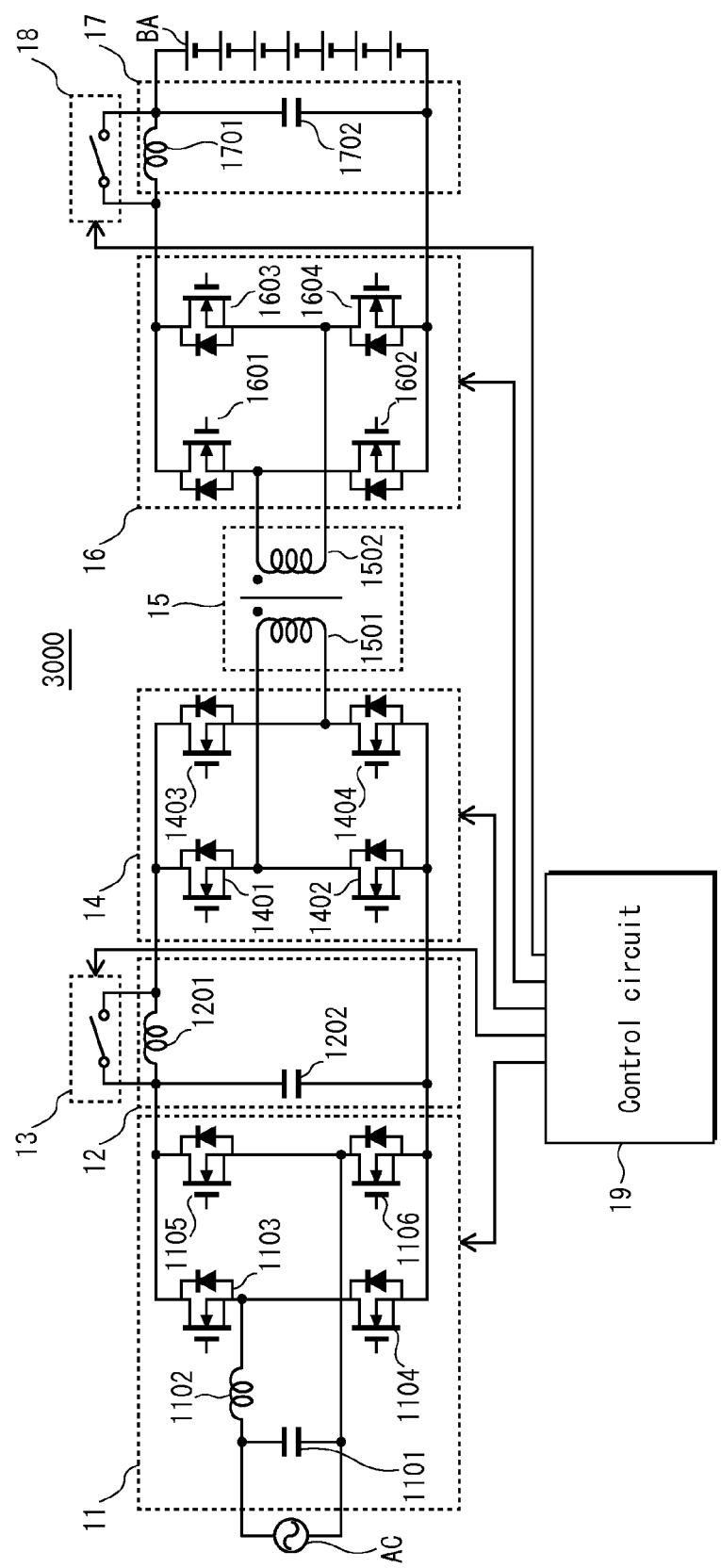
FIG. 19 is a circuit diagram showing the overall configuration of a battery charger 3000 pertaining to Embodiment 3.
Figure 20:
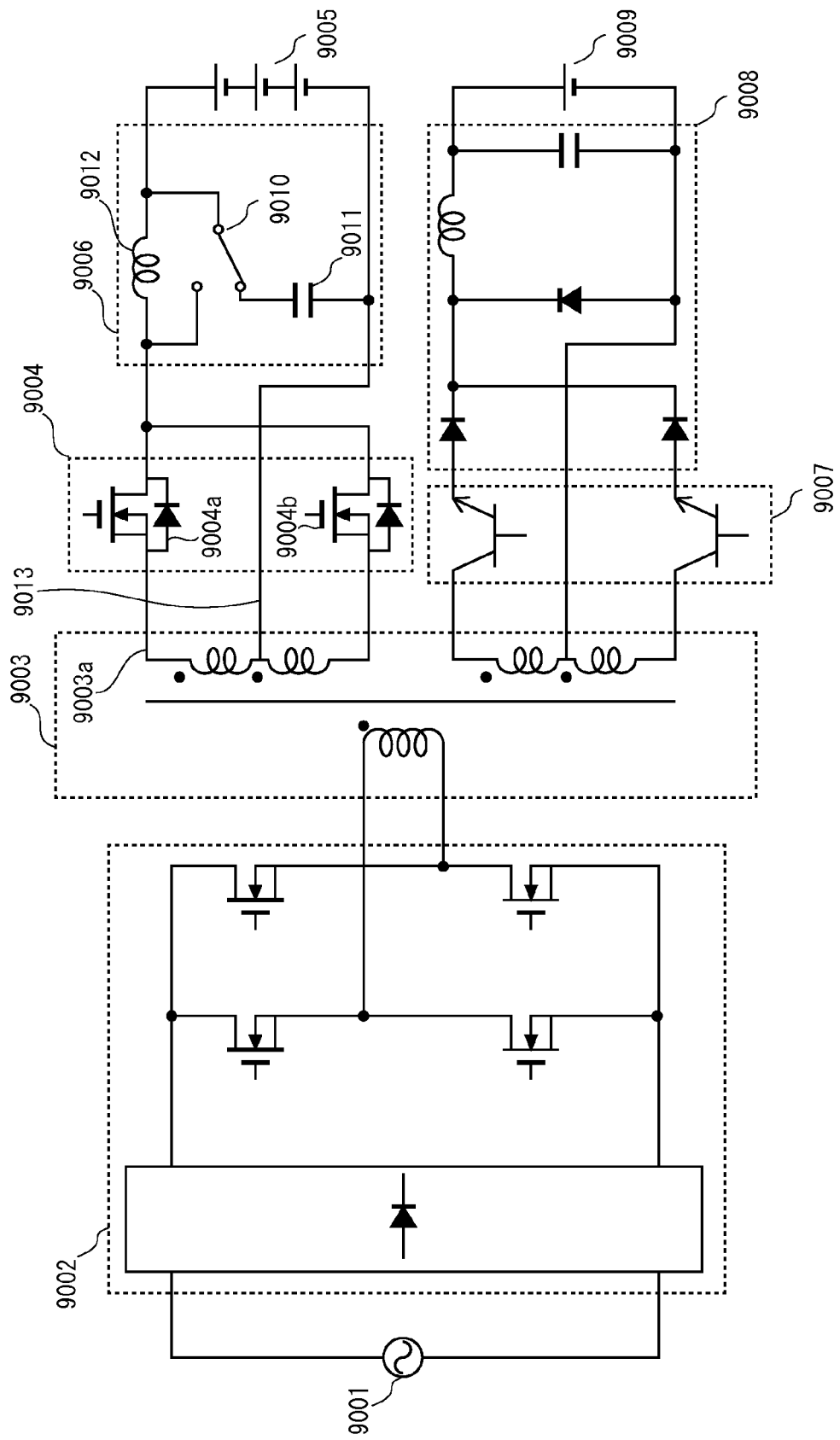
FIG. 20 is a circuit diagram showing the configuration of a power converter pertaining to Patent Literature 1.

FIG. 19 is a circuit diagram showing the overall configuration of a battery charger 3000 pertaining to Embodiment 3.

The battery charger 3000 includes a power factor correction circuit 11, a second smoothing circuit 12, a second choke coil short circuit 13, a primary side circuit 14, a transformer 15, a secondary side circuit 16, a first smoothing circuit 17, a first choke coil short circuit 18, and a control circuit 19. A primary winding 1501 of the transformer 15, a choke coil 1201 of the second smoothing circuit 12, the primary side circuit 14, and the control circuit 19 constitute a primary side power converter. Furthermore, a secondary winding 1502 of the transformer 15, a choke coil 1701 of the first smoothing circuit 17, the secondary side circuit 16, and the control circuit 19 constitute a secondary side power converter.

The secondary side circuit 16, the first smoothing circuit 17, and the first choke coil short circuit 18 respectively have a similar configuration and operate in a similar manner to the secondary side circuit 4, the first smoothing circuit 5, and the choke coil short circuit 6 pertaining to Embodiment 1. The description thereof is thus omitted. Transistors 1601 to 1604, and the choke coil 1701, and a capacitor 1702 in the present embodiment respectively correspond to the transistors 401 to 404, the choke coil 501, and the capacitor 502 in Embodiment 1.

<External Power Supply AC and Battery BA>

The external power supply AC is similar to that in Embodiment 1. As a battery BA, a lithium-ion battery as shown in Embodiment 1 and a nickel hydrogen battery, and the like are used, for example.

<Power Factor Correction Circuit 11>

The power factor correction circuit 11 is connected to the external power supply AC, and includes a capacitor 1101, a choke coil 1102, and a full-bridge circuit composed of transistors 1103, 1104, 1105, and 1106. Since the power factor correction circuit 11 includes the full-bridge circuit, an AC voltage can be converted into a DC voltage, and vice versa.

In the first time period, the power factor correction circuit 11 turns on and off the transistor 1104 or 1106 according to the polarity of the external power supply AC based on a signal from the control circuit 19, thereby converting an AC voltage supplied from the external power supply AC into a DC voltage of 380V, for example. The power factor correction circuit 11 then supplies the DC voltage resulting from the conversion to the second smoothing circuit 12. In the second time period, the power factor correction circuit 11 operates, based on a signal from the control circuit 19, so that (i) a time period for which the transistors 1103 and 1106 are on and the transistors 1104 and 1105 are off, (ii) a time period for which all the transistors 1103 to 1106 are off, (iii) a time period for which the transistors 1103 and 1106 are off and the transistors 1104 and 1105 are on, and (iv) the time period for which all the transistors 1103 to 1106 are off are repeated in that order, thereby converting a DC voltage into an AC voltage, and supplies the AC voltage to the external power supply AC.

<Second Smoothing Circuit 12 and Second Choke Coil Short Circuit 13>

The second smoothing circuit 12 is configured as a series circuit composed of a capacitor 1202 and the choke coil 1201 as a second inductor. The second choke coil short circuit 13 is achieved by a relay.

In the first time period, the second choke coil short circuit 13 performs a short-circuiting operation based on a signal from the control circuit 19. As a result, the choke coil 1201 is short-circuited by the second choke coil short circuit 13, and the second smoothing circuit 12 functions as a mere capacitor. In the second time period, the second choke coil short circuit 13 performs an opening operation based on a signal from the control circuit 19. As a result, the second smoothing circuit 12 acts as a filter circuit composed of the choke coil 1201 and the capacitor 1202, and a predetermined DC voltage is generated in the capacitor 1202.

<Primary Side Circuit 14>

The primary side circuit 14 is configured as a full-bridge circuit composed of third and fourth arms connected in parallel. The third arm includes transistors 1401 and 1402 connected in series, and the fourth arm includes transistors 1403 and 1404 connected in series. The transistors 1401 to 1404 have the same specification.

In the first time period, the primary side circuit 14 operates, based on a signal from the control circuit 19, so that (i) a time period for which the transistors 1401 and 1404 are on and the transistors 1402 and 1403 are off, (ii) a time period for which all the transistors 1401 to 1404 are off, (iii) a time period for which the transistors 1401 and 1404 are off and the transistors 1402 and 1403 are on, and (iv) the time period for which all the transistors 1401 to 1404 are off are repeated in that order, thereby converting a DC voltage into an AC voltage. In the second time period, the primary side circuit 14 rectifies an input AC voltage by using the body diodes of the transistors 1401 to 1404 based on a signal from the control circuit 19.

As described above, the primary side circuit 14 performs, in the first time period, the operation that the secondary side circuit 16 performs in the second time period, and performs, in the second time period, the operation that the secondary side circuit 16 performs in the first time period. As a result, the control signals for the transistors 1401 to 1404 output from the control circuit 19 have waveforms obtained by interchanging waveforms in the first time period and waveforms in the second time period of the control signals for the transistors 401 to 404 output from the control circuit 10 in Embodiment 1. Needless to say, however, the secondary side circuit 16 performs the operation according to the voltage induced in the secondary winding 1502, whereas the primary side circuit 14 performs the operation according to the voltage induced in the primary winding 1501.

<Transformer 15>

The transformer 15 has a primary winding 1501 and a secondary winding 1502. The primary winding 1501 is connected to the primary side circuit 14, and the secondary winding 1502 is connected to the secondary side circuit 16. In the first time period, the transformer 15 transfers the voltage induced in the primary winding 1501 to the secondary winding 1502. In the second time period, the transformer 15 transfers the voltage induced in the secondary winding 1502 to the primary winding 1501. Assume that the turns ratio of the primary winding 1501 to the secondary winding 1502 is 1:1.

The primary winding 1501 is connected to a junction of the transistors 1401 and 1402 at one end, and connected to a junction of the transistors 1403 and 1404 at the other end. In the primary winding 1501, the first voltage serving as the reference voltage and a third voltage different from the first voltage are alternately induced. The third voltage includes a positive third voltage that is a finite value above the first voltage and a negative third voltage that is a finite value below the first voltage.

The secondary winding 1502 is connected to a junction of the transistors 1601 and 1602 at one end, and connected to a junction of the transistors 1603 and 1604 at the other end. As in Embodiment 1, the first voltage serving as the reference voltage, the positive second voltage, and the negative second voltage are induced in the secondary winding 302.

<Control Circuit 19>

The control circuit 19 control operations of the power factor correction circuit 11, the second choke coil short circuit 13, the primary side circuit 14, the secondary side circuit 16, and the first choke coil short circuit 18. Descriptions of the control over operations of the secondary side circuit 16 and the first choke coil short circuit 18 are omitted, as they are similar to those in Embodiment 1.

In the first time period, the control circuit 19 performs control to turn on and off the transistor 1104 or 1106 included in the power factor correction circuit 11 so that the voltage across the capacitor 1202 becomes 380 V. The control circuit 19 also performs control to turn on and off the transistors 1401 to 1404 included in the primary side circuit 14 to so that the voltage across the capacitor 1702 becomes a voltage corresponding to the state of charge of the battery BA. The second choke coil short circuit 13 is short-circuited.

In the second time period, the control circuit 19 performs control to turn on and off each of the transistors 1103 to 1106 included in the power factor correction circuit 11 so that the voltage across the capacitor 1101 becomes an AC voltage of 100V. The second choke coil short circuit 13 is opened.

Regarding control over the primary side circuit 14, the control circuit 19 performs control so that each of the transistors 1401 to 1404 included in the primary side circuit 14 is basically off, and, as a result, rectification using body diodes of the transistors 1401 to 1404 is performed. In Embodiment 1, description is made on the high surge voltage generated in the secondary side power converter in the first time period. The high surge voltage can be generated also in the primary side power converter in the second time period in the present embodiment.

To address this problem, in the present embodiment, control is performed so that each of the transistors included in at least one of the third and fourth arms is on at least for a time period, within the time periods for which the first voltage is induced in the primary winding 1501 in the second time period, that (i) includes part or whole of a time period that is the rise time of the body diodes of the transistors 1401 to 1404 back from the time point when the voltage induced in the primary winding 1501 transitions from the first voltage to the third voltage, and (ii) is equal to or longer than the fall time of the body diode. As a result, the surge voltage generated in the primary winding 1501 in the second time period can be lowered.

The control pertaining to Embodiment 2 is also applicable to the primary side circuit 14 pertaining to the present application.

In each of the drawings for explaining Embodiments 1 to 3, the case of using a field-effect transistor is shown. The present invention, however, is not limited to such a case. As described above, insulated gate bipolar transistors may be used as the transistors 103, 201, 202, 203, 204, 701, 702, 1103, 1104, 1105, and 1106.

[Others]

As described in Embodiment 1 with use of FIGS. 14 and 15, as long as the body diodes of the transistors 401 and 404 included in the secondary side circuit have not completely risen at the time point when the voltage induced in the first secondary winding 302 transitions from the first voltage to the second voltage, the surge voltage can be lowered. In order to obtain the surge voltage lowering effect, it is necessary to satisfy the following three relations: (A) $P_{on2} > (\beta/\alpha)P_S$; (B) $0 \leq P_S < \alpha$; and (C) $P_{on}+P_S \leq P_X$. The same applies to the control over the primary side circuit 14 in the present embodiment. That is to say, as long as the body diodes of the transistors 1401 to 1404 have not completely risen at the time point when the voltage induced in the primary winding 1501 transitions from the first voltage to the third voltage, the surge voltage can be lowered.

Hereinafter, description is made on the assumption that a primary side on time period denotes a time period, in the second time period, for which each of the transistors 1401 to 1404 included in the primary side circuit 14 is on, $P_{on1}$ denotes a duration of the primary side on time period, $P_Y$ denotes a duration of a time period for which the first voltage is induced in the primary winding 1501, $P_T$ denotes a duration of a time period from the end of the primary side on time period to the time point when the voltage induced in the primary winding 1501 transitions from the first voltage to the third voltage, γ denotes a duration of a rise time of the body diodes of the transistors 1401 to 1404, and δ denotes a duration of a fall time of the body diodes.

In order to prevent the body diodes of the transistors 1401 to 1404 from completely rising at the time point when the voltage induced in the primary winding 1501 transitions from the first voltage to the third voltage, it is necessary to satisfy the following three relations: (F) $P_{on1} > (\delta/\gamma)P_T$; (G) $0 \leq P_T < \gamma$; and (H) $P_{on1}+P_T \leq P_Y$. The three relations (F) to (H) correspond to relations obtained by replacing $P_{on2}$, $P_S$, $P_X$, α, and β in the relations (A) to (C) described in Embodiment 1 with $P_{on1}$, $P_T$, $P_Y$, γ, and δ, respectively.

As described above, it is desirable that the body diodes of the transistors 401 to 404 have completely fallen at the time point when the voltage induced in the first secondary winding 302 transitions from the first voltage to the second voltage. To this end, it is necessary to further satisfy the following two relations: (D) $P_{on2} \geq \beta$; and (E) $P_S=0$. Similarly, in the primary side circuit 14, as long as the body diodes of the transistors 1401 to 1404 have completely fallen at the time point when the voltage induced in the primary winding 1501 transitions from the first voltage to the third voltage, the surge voltage can be lowered more effectively. To this end, it is necessary to satisfy, in addition to the three relations (F) to (H), the following two relations: (I) $P_{on1} \geq \delta$; and (J) $P_T=0$. The relations (I) and (J) correspond to relations obtained by rewriting the relations (D) and (E) according to the above-mentioned rule of replacement.

<<Modifications and Others>>

Embodiments 1 to 3 are described above. The present invention, however, is not limited to these embodiments. For example, modifications as described below are considered.

(1) The transistors included in the secondary side circuit are described to use the same specification. Thus, the rise times of the body diodes of the transistors included in the secondary side circuit are basically the same. Even when the transistors have the same specification, however, the rise times of the body diodes thereof may vary depending on the constant of other circuit elements, and the like. In such a case, the on time periods may differ among the transistors. Although the same on time period may be set for each of the transistors in order to simplify a control signal generating operation performed by the control circuit, it is desirable to set the on time periods for the transistors so as to be the same as the on time period for the transistor with the fastest rise time. As a result, none of the transistors has completely risen at the moment or immediately before the voltage induced in the first secondary winding transitions from the first voltage to the second voltage, achieving the effect of suppressing noise. The same applies to the primary side circuit in Embodiment 3.

(2) The expression "the transistor is on" includes not only the state in which the transistor has completely risen but also the state in which the transistor is transitioning from the off state to the on state. Similarly, the expression "the transistor is off" includes not only the state in which the transistor has completely fallen but also the state in which the transistor is transitioning from the on state to the off state.

(3) The above-mentioned "rise time of the body diode" and "fall time of the body diode" may be respectively different from the rise time and the fall time found in a data sheet of the field-effect transistor being used.

As described above, the rise time and the fall time of the body diode can vary depending not only on the specification for the transistor but also on the circuit configuration of the power converter, the constant of other circuit elements, and the like. The "rise time of the body diode" and the "fall time of the body diode" respectively mean the rise time and the fall time in consideration of elements other than the specification for the transistor itself. The rise time and the fall time in consideration of elements other than the specification for the transistor can be obtained by actually assembling the power converter and observing, with an oscilloscope, a waveform of a voltage between terminals of the transistor when the body diode of the transistor rises and falls.

(4) In Embodiments 1 and 2 described above, the power factor correction circuit is used. The present invention, however, is not limited to such a configuration. As long as an AC voltage for commercial use can be converted into a DC voltage, the power factor correction circuit may be replaced, for example, with a rectifier/smoothing circuit including a diode bridge and a capacitor. However, use of the power factor correction circuit is advantageous in that it supports a worldwide AC voltage, and there is no need to separately take any measures to regulate harmonic current.

(5) The voltage values and the switching frequency described in the above-mentioned embodiments are just examples, and may be different values from those described above. Although the output voltage of the power factor correction circuit 1 is set to 380 V in Embodiment 1, it may be set to 390 V, for example. Similarly, although the switching frequency used in the DC/AC inverter 2 is set to 100 kHz, it may be set to 150 kHz.

(6) In the above-mentioned embodiments, the primary winding 301, the first secondary winding 302, and the second secondary winding 303 included in the transformer 3 are set to be in the turns ratio of 5:5:1. This turns ratio, however, is just one example. Needless to say, the number of turns varies depending on the specifications for the output voltages of the power factor correction circuit, the main battery MBA, and the sub-battery SBA.

(7) In the above-mentioned embodiments, the choke coil short circuit is described to be achieved by a relay. The present invention, however, is not limited to such a configuration. The choke coil short circuit may be achieved by a switching element such as the transistor mentioned above. Since the FETs incorporate therein the body diodes, in order to achieve opening of these elements in both directions, any ingenuity, such as connecting two FETs in mutually-opposite direction in series, is required.

(8) In the above-mentioned embodiments, the control circuit 10 controls the operations of the DC/AC inverter 2 and secondary side circuit 4 via a simple duty control. The present invention, however, is not limited to such a configuration. As long as the voltage having the waveform shown in (l) and (m) of FIG. 2 is applied in the first time period, a so-called phase-shift control may be performed. The same applies to the control circuit 19 for controlling the operations of the primary side circuit 14 and the secondary side circuit 16.

(9) Each of the drawings only schematically shows arrangements of the elements to the extent that the present invention can be understood. The present invention is thus not limited to the examples illustrated in each of the drawings. For simplicity's sake, part of the configuration is omitted from of the drawings. Furthermore, a mark "~" and a preposition "to" used to show a numerical range indicate that numbers at both sides of the mark "~" and the preposition "to" are included in the range.

(10) The above-mentioned embodiments and modifications are mere preferred examples of the present invention, and the present invention is not limited to these examples. The configurations described in these embodiments and modifications may be combined with one another as appropriate.

INDUSTRIAL APPLICABILITY

The present invention is preferably applicable to a battery charger loaded in equipment that is required to be reduced in size, such as a hybrid electric vehicle, a normal electric vehicle, an electric compressor, an electric power steering, an elevator, and a wind power generation system.

REFERENCE SIGNS LIST 1, 11 power factor correction circuit
2 DC/AC inverter
3, 15, 9003, 9003A transformer
4, 16, 9004, 9004A2 secondary side circuit
5, 17 first smoothing circuit
6 choke coil short circuit
7, 9007 conduction angle adjustment circuit
8 rectifier circuit
9, 12 second smoothing circuit
10, 19 control circuit
13 second choke coil short circuit
14 primary side circuit
18 first choke coil short circuit
101 diode bridge
102, 501, 901, 902, 1102, 1201, 1701 choke coil
103, 201, 202, 203, 204, 401, 402, 403, 404, 701, 702, 1103, 1104, 1105, 1106, 1401, 1402, 1403, 1404, 1601, 1602, 1603, 1604, 9004a, 9004b, 9004c, 9004d, 9004e, 9004f transistor
104, 801, 802 diode
105, 502, 903, 1101, 1202, 1702, 9011 capacitor
301 primary winding
302 first secondary winding
303 second secondary winding
1501 primary winding
1502 secondary winding
1000 battery charger
AC, 9001 external power supply
BA battery
MBA, 9005 main battery
SBA, 9009 sub-battery
9002 power supply circuit
9003a, 9003b secondary winding
9006 smoothing circuit
9008 rectifier/smoothing circuit
9010 relay
9012 choke coil
9013 center tap

The invention claimed is:

1. A power converter having an output terminal connected to an inductor, comprising:
a transformer in which a first voltage serving as a reference voltage and a second voltage different from the first voltage are alternately induced;
a full-bridge circuit on a power supply route connecting the transformer to the inductor, the full-bridge circuit including a first arm and a second arm connected in parallel, the first arm and the second arm each including a plurality of field-effect transistors connected in series; and
a control circuit configured to perform control to turn on and off each of the field-effect transistors included in the full-bridge circuit, wherein
within a time period for which the first voltage is induced in the transformer, the control circuit performs control so that each of the field-effect transistors included in at least one of the first arm and the second arm is on, and
when $P_{on}$ denotes a duration of an on time period for which each of the field-effect transistors included in the at least one of the first arm and the second arm is on, $P_X$ denotes a duration of the time period for which the first voltage is induced in the transformer, $P_S$ denotes a duration of a time period from the end of the on time period to a time point when the first voltage induced in the transformer transitions to the second voltage, α denotes a duration of a rise time of a body diode of each of the field-effect transistors, and β denotes a duration of a fall time of the body diode, $P_{on}$, $P_X$, $P_S$, α, and β satisfy the relations $P_{on} > (\beta/\alpha) P_S$, $0 \leq P_S < \alpha$, and $P_{on} + P_S \leq P_X$.

2. The power converter according to claim 1, wherein the duration of the on time period $P_{on}$ is equal to or longer than the duration of the fall time of the body diode β and the relation $P_S = 0$ is satisfied.

3. The power converter according to claim 1, wherein the control circuit performs control so that each of the field-effect transistors included in both the first arm and the second arm is on for the on time period.

4. The power converter according to claim 1, wherein the second voltage includes:
    a positive second voltage that is a finite value above the first voltage; and
    a negative second voltage that is a finite value below the first voltage,
the on time period includes:
    a positive on time period that is within a time period from a time point when the negative second voltage induced in the transformer transitions to the first voltage to a time point when the first voltage induced in the transformer transitions to the positive second voltage; and
    a negative on time period that is within a time period from a time point when the positive second voltage induced in the transformer transitions to the first voltage to a time point when the first voltage induced in the transformer transitions to the negative second voltage, and
the control circuit performs control so that each of the field-effect transistors included in the at least one of the first arm and the second arm is on for both the positive on time period and the negative on time period.

5. The power converter according to claim 1, wherein the control circuit performs control so that each of the field-effect transistors included in the at least one of the first arm and the second arm is on all through the time period for which the first voltage is induced in the transformer.

6. A battery charger selectively performing a first operation to charge a battery and a second operation to discharge the battery, comprising:
    a transformer including a primary winding and a secondary winding, a first voltage serving as a reference voltage and a second voltage different from the first voltage being alternately induced in the secondary winding;
    a secondary side circuit that includes a full-bridge circuit on a power supply route connecting the secondary winding to the battery, the full-bridge circuit including a first arm and a second arm connected in parallel, the first arm and the second arm each including a plurality of field-effect transistors connected in series;
    a smoothing circuit on a power supply route connecting the secondary side circuit to the battery, the smoothing circuit including an inductor; and
    a control circuit configured to perform control to turn on and off each of the field-effect transistors included in the secondary side circuit so that the secondary side circuit performs, in a first time period for which the first operation is performed, an operation to rectify an AC voltage induced in the secondary winding and supply the rectified voltage to the battery, and, in a second time period for which the second operation is performed, an operation to convert a DC voltage from the battery into an AC voltage and supply the AC voltage resulting from the conversion to the secondary winding, wherein
within a time period, in the first time period, for which the first voltage is induced in the secondary winding, the control circuit performs control so that each of the field-effect transistors included in at least one of the first arm and the second arm is on, and
when $P_{on2}$ denotes a duration of a secondary side on time period for which each of the field-effect transistors included in the at least one of the first arm and the second arm is on, $P_X$ denotes a duration of the time period for which the first voltage is induced in the secondary winding, $P_S$ denotes a duration of a time period from the end of the secondary side on time period to a time point when the first voltage induced in the secondary winding transitions to the second voltage, α denotes a duration of a rise time of a body diode of each of the field-effect transistors, and β denotes a duration of a fall time of the body diode, $P_{on2}$, $P_X$, $P_S$, α, and β satisfy the relations $P_{on2} > (\beta/\alpha) P_S$, $0 \leq P_S < \alpha$, and $P_{on2} + P_S \leq P_X$.

7. The battery charger according to claim 6, wherein the duration of the secondary side on time period $P_{on2}$ is equal to or longer than the duration of the fall time of the body diode β and the relation $P_S = 0$ is satisfied.

8. The battery charger according to claim 6, wherein in the first time period, the control circuit performs control so that each of the field-effect transistors included in both the first arm and the second arm is on for the secondary side on time period.

9. The battery charger according to claim 6, wherein in the first time period, the control circuit performs control so that each of the field-effect transistors included in the at least one of the first arm and the second arm is on all through the time period for which the first voltage is induced in the secondary winding.

10. The battery charger according to claim 6, further comprising:
    a primary side circuit that includes a full-bridge circuit connected to the primary winding, the full-bridge circuit including a third arm and a fourth arm connected in parallel, the third arm and the fourth arm each including a plurality of field-effect transistors connected in series; and
    a second smoothing circuit connected to the primary side circuit, and including a second inductor different from the inductor included in the smoothing circuit, wherein
the first voltage and a third voltage different from the first voltage are induced in the primary winding,
the control circuit further performs control to turn on and off each of the field-effect transistors included in the primary side circuit so that the primary side circuit performs, in the first time period, an operation to convert a DC voltage input from the second smoothing circuit into an AC voltage and supply the AC voltage resulting from the conversion to the primary winding, and, in the second time period, an operation to rectify an AC voltage induced in the primary winding and supply the rectified voltage to the second smoothing circuit,
within a time period, in the second time period, for which the first voltage is induced in the primary winding, the control circuit performs control so that each of the field-effect transistors included in at least one of the third arm and the fourth arm is on, and when $P_{on1}$ denotes a duration of a primary side on time period for which each of the field-effect transistors included in the at least one of the third arm and the fourth arm is on, $P_Y$ denotes a duration of the time period for which the first voltage is induced in the primary winding, $P_T$ denotes a duration of a time period from the end of the primary side on time period to a time point when the first voltage induced in the primary winding transitions to the third voltage, $\gamma$ denotes a duration of a rise time of a body diode of each of the field-effect transistors included in the primary side circuit, and $\delta$ denotes a duration of a fall time of the body diode of each of the field-effect transistors included in the primary side circuit, $P_{on1}$, $P_Y$, $P_T$, $\gamma$, and $\delta$ satisfy the relations $P_{on1} > (\delta/\gamma)P_T$, $0 \leq P_T < \gamma$, and $P_{on1} + P_T \leq P_Y$.

11. The battery charger according to claim 10, wherein the duration of the primary side on time period $P_{on1}$ is equal to or longer than the duration of the fall time of the body diode $\delta$ and the relation $P_T = 0$ is satisfied.

12. The battery charger according to claim 10, wherein in the second time period, the control circuit performs control so that each of the field-effect transistors included in both the third arm and the fourth arm is on for the primary side on time period.

13. The battery charger according to claim 10, wherein in the second time period, the control circuit performs control so that each of the field-effect transistors included in the at least one of the third arm and the fourth arm is on all through the time period for which the first voltage is induced in the primary winding.

14. The battery charger according to claim 6, wherein when the secondary winding is referred to as a first secondary winding, the transformer further includes a second secondary winding different from the first secondary winding, the battery charger further comprises
  a conduction angle adjustment circuit connected to the second secondary winding at an input side thereof, the conduction angle adjustment circuit being configured to supply a voltage induced in the second secondary winding to an output side thereof when being in a conductive state, and configured not to supply the voltage induced in the second secondary winding to the output side when being in a non-conductive state, and the control circuit further controls the conduction angle adjustment circuit to switch between the conductive state and the non-conductive state so that the conduction angle adjustment circuit is in the conductive state for a time period including the time point when the first voltage induced in the first secondary winding transitions to the second voltage.

15. The battery charger according to claim 14, wherein the conduction angle adjustment circuit is on a power supply route connecting the second secondary winding to a second battery different from the battery.

16. A battery charger selectively performing a first operation to charge a main battery and a sub-battery by an external power supply and a second operation to charge the sub-battery by the main battery, comprising:
  a power supply circuit connected to the external power supply to generate an AC voltage;
  a transformer including a primary winding connected to the power supply circuit, a first secondary winding in which a first voltage serving as a reference voltage and a second voltage different from the first voltage are alternately induced, and a second secondary winding;
  a secondary side circuit that includes a full-bridge circuit on a power supply route connecting the first secondary winding to the main battery, the full-bridge circuit including a first arm and a second arm connected in parallel, the first arm and the second arm each including a plurality of field-effect transistors connected in series;
  a smoothing circuit on a power supply route connecting the secondary side circuit to the main battery, the smoothing circuit including an inductor;
  a conduction angle adjustment circuit on a power supply route connecting the second secondary winding to the sub-battery, the conduction angle adjustment circuit being configured to adjust an conduction angle of an AC voltage induced in the second secondary winding; and
  a control circuit configured to perform control to turn on and off each of the field-effect transistors included in the secondary side circuit so that the secondary side circuit performs, in a first time period for which the first operation is performed, an operation to rectify an AC voltage induced in the first secondary winding and supply the rectified voltage to the main battery, and, in a second time period for which the second operation is performed, an operation to convert a DC voltage from the main battery into an AC voltage and supply the AC voltage resulting from the conversion to the first secondary winding, wherein within a time period, in the first time period, for which the first voltage is induced in the first secondary winding, the control circuit performs control so that each of the field-effect transistors included in at least one of the first arm and the second arm is on, and when $P_{on}$ denotes a duration of an on time period for which each of the field-effect transistors included in the at least one of the first arm and the second arm is on, $P_X$ denotes a duration of the time period for which the first voltage is induced in the first secondary winding, $P_S$ denotes a duration of a time period from the end of the on time period to a time point when the first voltage induced in the first secondary winding transitions to the second voltage, $\alpha$ denotes a duration of a rise time of a body diode of each of the field-effect transistors, and $\beta$ denotes a duration of a fall time of the body diode, $P_{on}$, $P_X$, $P_S$, $\alpha$, and $\beta$ satisfy the relations $P_{on} > (\beta/\alpha)P_S$, $0 \leq P_S < \alpha$, and $P_{on} + P_S \leq P_X$.

17. The battery charger according to claim 16, wherein the duration of the on time period $P_{on}$ is equal to or longer than the duration of the fall time of the body diode $\beta$ and the relation $P_S = 0$ is satisfied.

18. The battery charger according to claim 16, wherein in the first time period, the control circuit performs control so that each of the field-effect transistors included in both the first arm and the second arm is on for the on time period.

19. The battery charger according to claim 16, wherein in the first time period, the control circuit performs control so that each of the field-effect transistors included in the at least one of the first arm and the second arm is on all through the time period for which the first voltage is induced in the first secondary winding.

20. The battery charger according to claim 16, wherein the conduction angle adjustment circuit supplies a voltage induced in the second secondary winding to an output side thereof when being in a conductive state, and does not supply the voltage induced in the second secondary winding to the output side when being in a non-conductive state, and the control circuit further controls the conduction angle adjustment circuit to switch between the conductive state and the non-conductive state so that the conduction angle adjustment circuit is in the conductive state for a time period including the time point when the first voltage induced in the first secondary winding transitions to the second voltage.

* * * * *